(12) United States Patent
Armau et al.

(10) Patent No.: US 9,283,556 B2
(45) Date of Patent: Mar. 15, 2016

(54) TIGHT CONNECTION AND TIGHT TRANSFER BETWEEN TWO HOUSINGS IN VIEW OF AN ASEPTIC TRANSFER THEREBETWEEN

(75) Inventors: Stephanie Armau, Ossun (FR); Isabelle Gay, Peypin (FR); Mathieu Labedan, Loegnan (FR); Gaelle Nodin, Saint Maximin la Sainte Baume (FR)

(73) Assignee: SARTORIUS STEDIM ASEPTICS, Lourdes (FR)

( * ) Notice: Subject to any disclaimer, the term of this patent is extended or adjusted under 35 U.S.C. 154(b) by 613 days.

(21) Appl. No.: 13/511,221

(22) PCT Filed: Nov. 23, 2010

(86) PCT No.: PCT/FR2010/052490
§ 371 (c)(1),
(2), (4) Date: Jul. 16, 2012

(87) PCT Pub. No.: WO2011/061463
PCT Pub. Date: May 26, 2011

(65) Prior Publication Data
US 2012/0267367 A1  Oct. 25, 2012

(30) Foreign Application Priority Data
Nov. 23, 2009 (FR) ..................................... 09 58267

(51) Int. Cl.
*G21F 7/047* (2006.01)
*B01L 1/02* (2006.01)
(Continued)

(52) U.S. Cl.
CPC .. *B01L 1/02* (2013.01); *F16J 13/02* (2013.01); *F16J 13/18* (2013.01); *F16J 13/22* (2013.01);
(Continued)

(58) Field of Classification Search
CPC ...................................................... G21F 7/047
USPC ............ 220/501; 414/292; 312/291; 49/506, 49/507
See application file for complete search history.

(56) References Cited

U.S. PATENT DOCUMENTS

| 3,489,298 A | 1/1970 | Samsel et al. |
| 5,421,626 A | 6/1995 | Glachet |

(Continued)

FOREIGN PATENT DOCUMENTS

| EP | 0 586 307 A1 | 3/1994 |
| EP | 0 662 373 A1 | 7/1995 |

(Continued)

OTHER PUBLICATIONS

International Search Report, dated Feb. 24, 2011, from corresponding PCT application.

*Primary Examiner* — Anthony Stashick
*Assistant Examiner* — Raven Collins
(74) *Attorney, Agent, or Firm* — Young & Thompson

(57) ABSTRACT

A device for a tight connection between a first housing (1) having a wall (3), an opening (4), a flange (5) and a door (6), and a second housing (2) having a wall (7), an opening (8), a flange (9) and a door (10). The flanges are complementary, and elements are used to displace the door (6). Elements are used to hold the two doors against each other, and the housings communicate between each other via a communication space (13). There is an inner annular critical line on the door (6) and an outer annular critical line of risk of contamination on the flange (9). The device includes elements (25 and/or 26) that are structurally integrated into the door (6) and/or the flange (9) and can form a separation between the communication space and the inner annular critical line and/or the outer annular critical line, when the doors are open.

19 Claims, 19 Drawing Sheets

(51) Int. Cl.
*F16J 13/02* (2006.01)
*F16J 13/18* (2006.01)
*F16J 13/22* (2006.01)
*G21F 7/005* (2006.01)

(52) U.S. Cl.
CPC ...... *B01L 2200/141* (2013.01); *B01L 2300/041* (2013.01); *B01L 2300/043* (2013.01); *B01L 2300/045* (2013.01); *G21F 7/005* (2013.01)

(56) References Cited

U.S. PATENT DOCUMENTS

| | | | |
|---|---|---|---|
| 5,853,207 | A | 12/1998 | Saint Martin et al. |
| 6,307,206 | B1 | 10/2001 | Riviere et al. |
| 6,553,722 | B1 | 4/2003 | Porret et al. |
| 6,591,662 | B1 | 7/2003 | Grimard et al. |
| 2005/0168117 | A1 | 8/2005 | Porret |
| 2009/0212054 | A1 | 8/2009 | Allen, Jr. |

FOREIGN PATENT DOCUMENTS

| | | |
|---|---|---|
| EP | 0 688 020 A1 | 12/1995 |
| EP | 0 730 907 A2 | 9/1996 |
| EP | 0 830 896 A2 | 3/1998 |
| EP | 0 830 907 A2 | 3/1998 |
| EP | 0 960 698 A1 | 12/1999 |
| EP | 1 141 974 B1 | 5/2004 |
| EP | 1 141 672 B1 | 10/2004 |
| EP | 2 091 051 A1 | 8/2009 |
| EP | 1 454 328 B1 | 2/2010 |
| FR | 2 787 235 A1 | 6/2000 |
| FR | 2 833 745 A1 | 6/2003 |
| WO | 95/34078 A1 | 12/1995 |
| WO | 96/21615 A2 | 7/1996 |
| WO | 03/041087 A1 | 5/2003 |

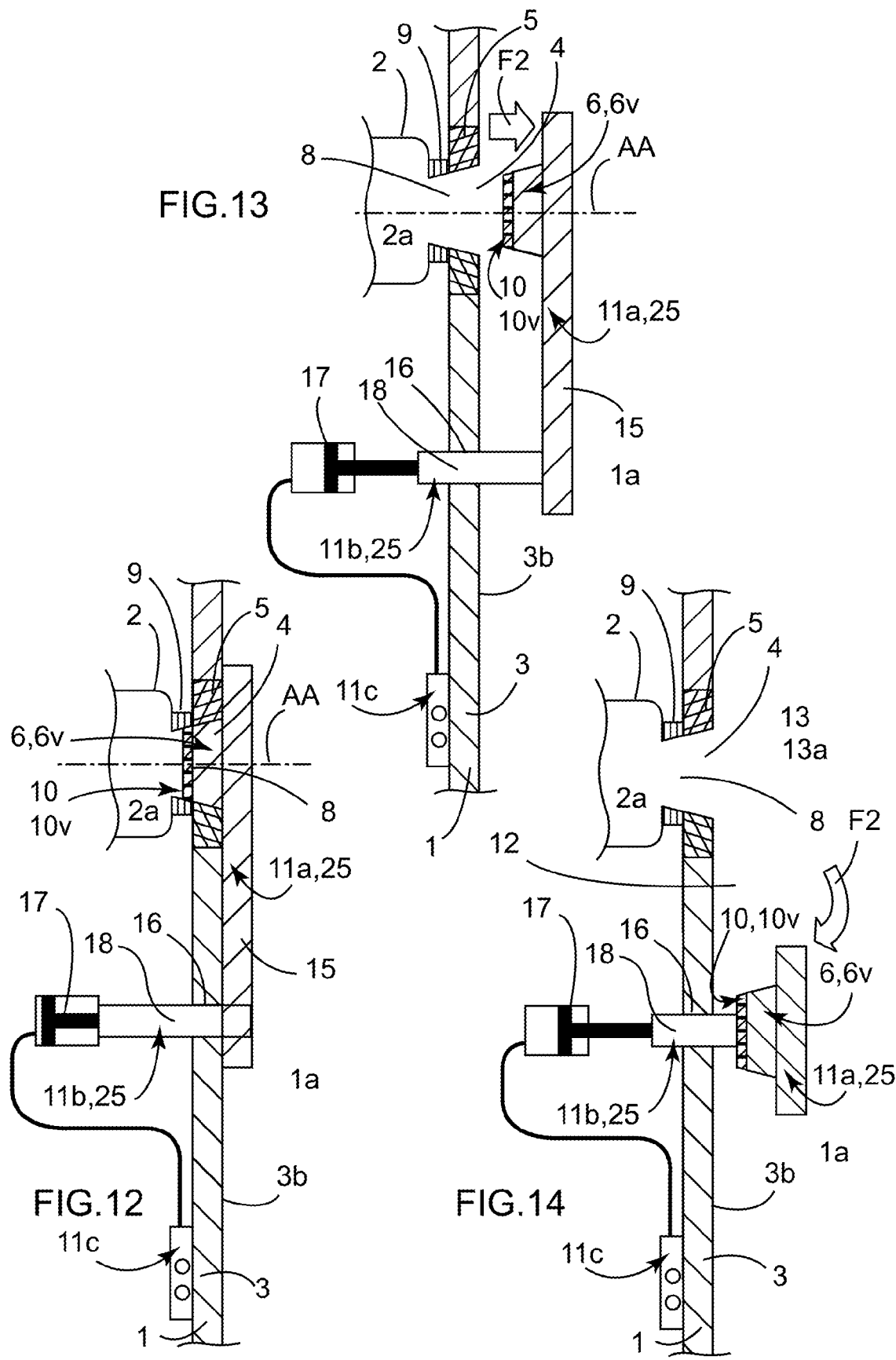

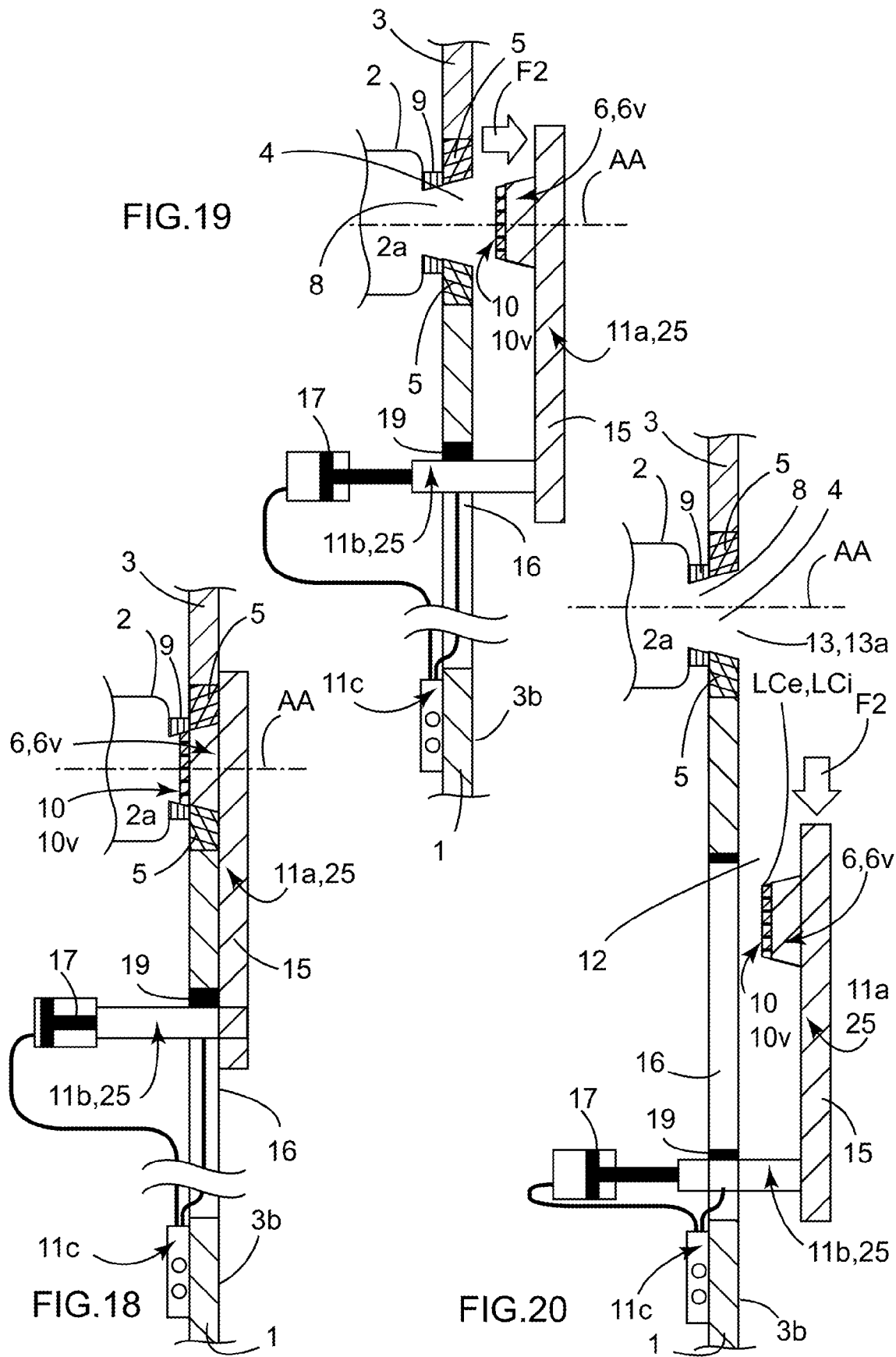

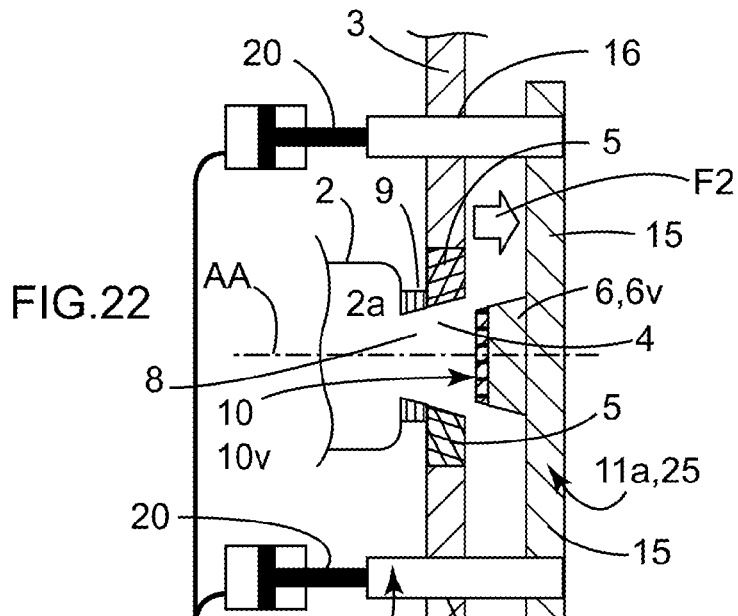
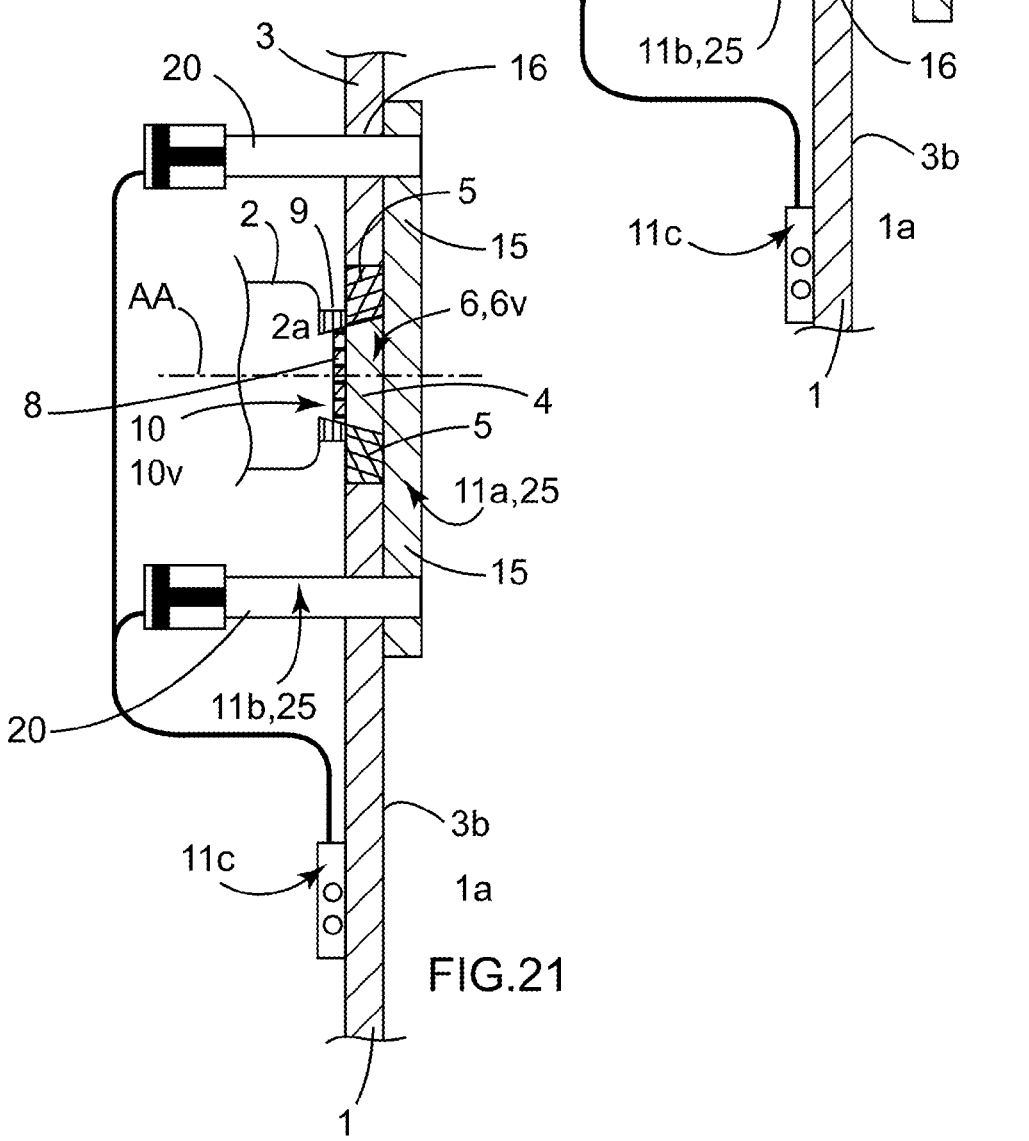
FIG.22
FIG.21

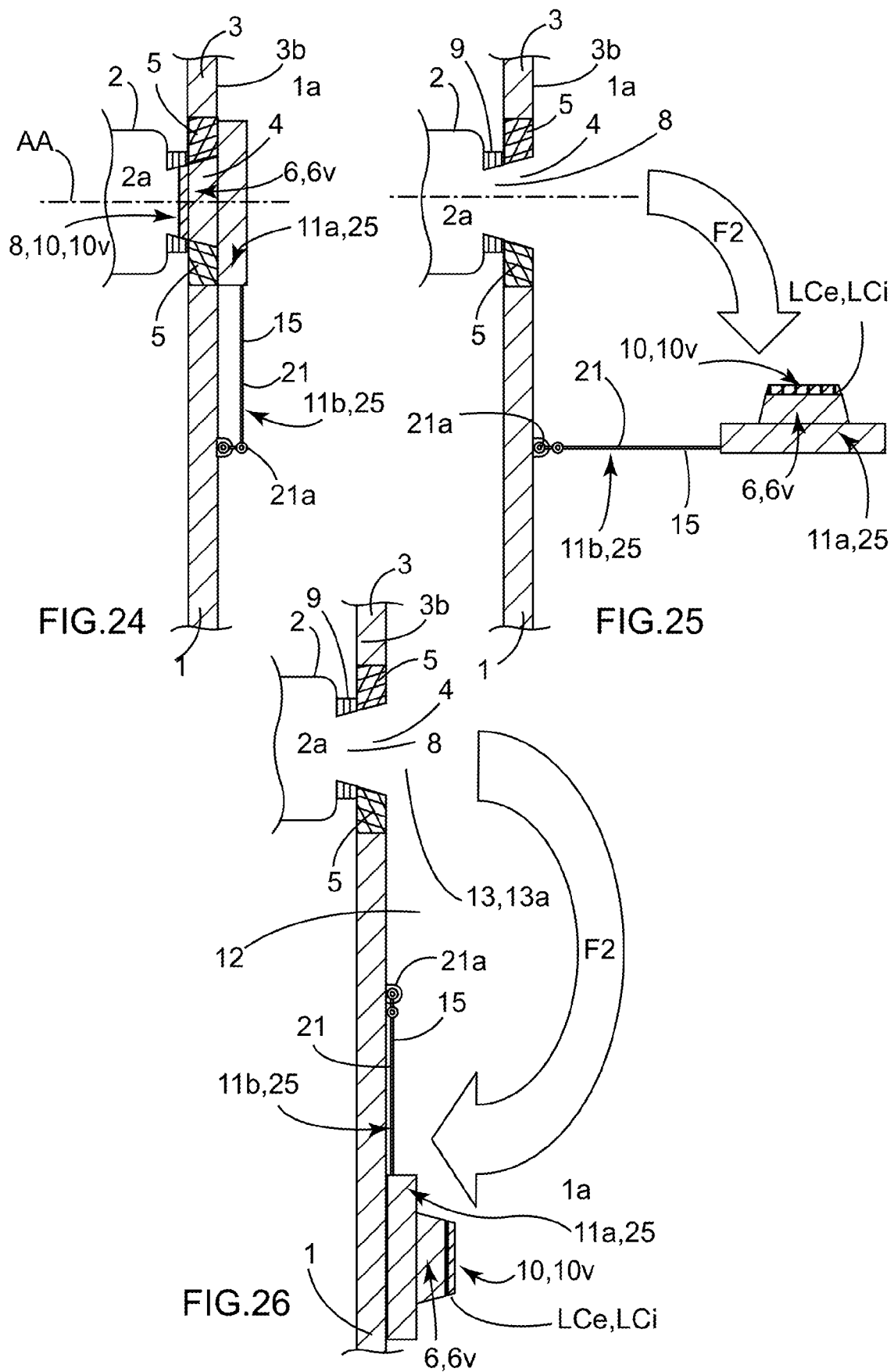

TIGHT CONNECTION AND TIGHT TRANSFER BETWEEN TWO HOUSINGS IN VIEW OF AN ASEPTIC TRANSFER THEREBETWEEN

The invention relates to improvements provided to the sealed junction and the sealed transfer between two chambers for the purpose of aseptic transfer between them, limiting the risks of contamination at the locations of the inside and outside critical lines.

The invention more specially has as its object a sealed junction device between two chambers, an aseptic transfer device that comprises such a sealed junction device, and a first chamber and a second chamber that are part of such an aseptic transfer device, the process for implementing the sealed junction device, and the process for implementing the sealed transfer device.

Double-door-type aseptic transfer devices are already known. Purely by way of example, it is possible to cite the devices that are known under the trademark BIOSAFE® and the document EP-A-0688020 that describes a sealed junction device between two chambers that are isolated from an external environment.

With such an embodiment, a structure that includes a first wall that is equipped with a first opening that is bordered by a first annular flange that forms, on the one hand, an interface (with a second flange), and, on the other hand, a seat for a first panel of a first door, are part of a first chamber—for example, a chamber that is stationary, rigid and of relatively large size. The first door is supported by the structure by means of carrying means, of a mechanical, movable or deformable nature. The first panel is mounted to move—namely in rotation—and arranged to be in the closed state or in the open state or, respectively, it closes or opens the first opening. Movement actuation means are able to move the first panel.

A second wall that is equipped with a second opening that is bordered by a second annular flange that forms, on the one hand, an interface (with the first flange), and, on the other hand, a seat for a second panel of a second door that is mounted to move and arranged to be in the closed state or in the open state, where, respectively, it closes or opens the second opening, are part of a second chamber—for example a movable, disposable, and at least partly flexible container that is of smaller size.

The first flange, the first panel, the second flange, and the second panel each have an inside surface that is located toward the inside, respectively, of the first chamber, the second chamber, and an outside surface that is in contact with the external environment with two chambers.

The first flange and the second flange are complementary and able to be held in a removable way, flattened against one another by their outside surfaces, hermetically sealed, by thus being isolated from the external environment, owing to removable holding means with which they are equipped, for example a cam mechanism.

The first door and the second door are complementary, and their panels are able to be flattened against one another by their outside surfaces, hermetically sealed, by thus being isolated from the external environment, and to be kept thus flattened in a removable way, owing to removable interlocking means with which they are equipped.

For this purpose, the flanges and the panels have respective surfaces that are designed to be flattened against one another and of which the shapes are complementary, and sealing joints can be provided where necessary.

Movement actuation means are also provided, and said means are able to move the first panel of the first door, with which the second panel of the second door can be made integral, between its closed and open states, as well as monitoring means of these movement actuation means.

The process for implementing a sealed junction device of the preceding type comprises the following successive operating stages:
  The first chamber of which the first panel of the door is in the closed state and the second chamber of which the second panel of the second door is in the closed state are available;
  The two chambers are brought close to one another, and the first flange and the second flange are flattened against one another in a hermetically sealed way by their outside surfaces, and the panel of the first door and the panel of the second door are brought to be flattened against one another in a hermetically sealed way;
  The first flange and the second flange, on the one hand, and the first panel and the second panel, on the other hand, are held, and the first panel is actuated to move it and to bring it into the open state and thus also to bring the second panel into the open state.

Thus, the first chamber and the second chamber are in communication with one another via their respective openings in the open state, with a communication space being made between the two chambers, making it possible to pass certain contents between them and thus to transfer said contents from one to the other of the two chambers. This communication space consists of an entrance/exit space in the first chamber and an entrance/exit space in the second chamber, whereby these two entrance/exit spaces are in communication with one another.

The process for implementing a device for sealed transfer between two chambers including such a sealed junction device comprises the following successive operating stages:
  Two chambers in the closed state, one originally containing certain contents to be transferred, are available;
  The sealed junction device is implemented as it was just indicated;
  Once the first panel of the first door and the second panel of the second door are in the open state and once the first chamber and the second chamber are in communication with one another via the communication space, the certain contents of the chamber are passed from where they were located originally to the other chamber where they are to be located ultimately;
  Once this transfer is carried out, the panels of the first door and the second door are brought into the closed state;
  Then, the two chambers are separated.

As appropriate, the certain contents are originally in the first chamber or in the second chamber.

Transfers such as those in question here may be needed in a number of technical fields, in particular but not exclusively the biopharmaceutical field. The invention quite especially focuses on this field, as with those that can be considered as analogous in relation to the imposed requirements.

The contents—to be transferred or that have been transferred—are not per se crucial to the invention if they are only to be transferred and therefore are supposed to be capable of being transferred. In the biopharmaceutical field, it may be a matter of, for example, a sterile object such as a receptacle, a receptacle element such as a stopper, or a syringe, but also environmental monitoring elements, and even waste produced during the manufacturing or treatment operation, waste that is to be transferred so as to dispose of it . . . .

More complex transfers, such as those considered here, most often are involved within the process framework in which the certain contents experience one or more operations before and/or after the transfer. These operations consist of manufacturing, assembly, treatment, handling, use, measurement, monitoring, analysis, etc.

In the case of an operating line, a first chamber may be provided that comprises a wall that is equipped with both the same number of first openings and first doors, as well as sealed junction devices with a multiplicity of second chambers.

In the case of the embodiment that is known under the trademark BIOSAFE®, the carrying means and the movement actuation means of the first door and its panel comprise a hinge of which the axis—vertical and lateral—is located in the first chamber itself (inside space of this first chamber), in or close to the inside surface of its wall, close to its opening and its flange, with the rotation around the hinge being implemented manually or in a motorized way (actuator, motor, . . . ). In the closed state, the first panel is retracted in the plane of the first wall or in its vicinity, the first opening, and the first flange. In the open state, the first panel, which is designed to then support the second panel, is projecting, in the first chamber, in particular arranged more or less perpendicularly to the plane of the first wall, the first opening, and the first flange. The movement of the panel between its closed state and its open state (and vice versa) is on the order of one-third of a turn. As for the movement actuation means, such as an actuator, motor, . . . , they are able to move the first panel in rotation over this path.

In the embodiments described in the document EP-A-2091051 where the axis is also vertical and lateral, in the documents EP-A-1 141 974, EP-A-1 454 328, EP-A-0 730 907, EP-A-0 830 896 where the axis is horizontally below (below the opening and the flange) and in the document EP-A-0 662 373 where the axis is horizontally above, in the open state, the first panel, which then supports the second panel, is projecting as above into the first chamber and more or less perpendicular to the plane of the first wall, the first opening, and the first flange.

As the document EP-A-1141672 states, one skilled in the art knows that with the type of aseptic transfer device considered, there exists what one calls a "critical line" with residual contamination by the external environment with two chambers. It is possible that this line comes into contact with the external environment that is in the passage between the two chambers or in contact with the contents that pass through this passage to be transferred from one chamber to the next, with consequent contamination. This critical line is sometimes called "critical zone" or "ring of concern" (see PIC/S—Pharmaceutical Inspection Convention—RECOMMENDATION—ISOLATORS USED FOR ASEPTIC PROCESSING AND STERILITY TESTING).

More specifically, there are two approximately concentric critical lines when the two doors are in the closed state.

An inside critical line is on the outside surface of the first door, more specifically its panel, in contact with the external environment and not overlapped by the outside surface of the second door, more specifically its panel, when the two panels are flattened against one another.

An outside critical line is on the outside surface of the second flange in contact with the external environment and not overlapped by the outside surface of the first flange, when the two flanges are flattened against one another.

In the embodiments cited above, in the open state of the first panel, the first panel, which supports the second panel, is laterally adjacent to the lateral boundary of the entrance/exit space of the first chamber. Thus, the first panel and/or the second panel can be found to be brought into contact with the certain contents during its passage into the entrance/exit space, with risks of contamination by the inside critical line.

Several solutions have been proposed for the purpose of remedying this risk of contamination, also mentioned in *ISOLATION TECHNOLOGY—A PRACTICAL GUIDE*, published by CRC Press in 2004.

The document EP-A-0960698 provides decontamination means using ultraviolet, pulsed-ultraviolet, or pulsed-light radiation.

The document EP-A-0662373 provides that a flanged ring of the aseptic transfer device comprises a heat-resistant annular element whose purpose is to maintain maximum integrity of the device against possible contamination. Variants of the heating technology are described in the documents EP-A-730907 and EP-A-830907. The technology of sterilization by dry heat was indicated as being the preferred solution according to the presentation made by the Barrier Users Group Symposium (BUGS) at the conference of Jan. 17 and 18, 1995.

The document EP-A-1454328 describes an aseptic transfer device that comprises a device for protection of the single outside critical line. This protective device comprises an annular part and a support arm. The annular part comprises a tapered portion and a circular portion. The tapered portion is sized in such a way as to be able, when the first panel of the first door is in the open state, to be engaged through the seat that is bordered by the flange of the first chamber, in such a way as to overlap the areas of the flange forming this seat, while the circular portion is shaped in such a way as to rest against the surface of the flange that is turned toward the inside of the first chamber so as to position the tapered portion axially with respect to the flange, by overlapping and without contact. For this purpose, the arm is mounted to pivot on a wall of the first chamber. Such a protective device is mounted inside the first chamber, and it is structurally independent of the first door and not integrated therein. This embodiment is therefore complex and bulky, in addition to the fact that it involves having to act on the support arm that is located in the first chamber. Ultimately, this embodiment does not provide any solution regarding the inside critical line.

Concerning the outside critical line, it has also been proposed to provide a flexible horn that is supported by the second chamber and that is unfolded after the second chamber is brought into the open state, or a rigid horn that is installed after opening, or else a removable funnel. These solutions are only palliatives. The technology that uses a horn poses several problems: risk of failing to install or of mispositioning the horn during the manufacturing of the second chamber, errors during use, risk of contamination during the installation of a flexible horn . . . . The technology that uses a funnel poses other problems: space requirement in the first chamber, risk of particles . . . . Whether it involves a horn or a funnel, such an element is connected to the first door, being structurally independent of it and not integrated into it.

The state of the art also comprises the documents U.S. Pat. No. 3,489,298, EP 0586307, FR 2833745, EP 0830 896, FR 2787 235, US 2009/212054, WO 96/21615, WO 03/041087 and WO 95/34078. However, none of these documents provides an arrangement such that there is a separation between the communication space and both the inside critical annular line and the outside critical annular line.

The problem on which the invention is based is therefore to equip a sealed junction device between two chambers that are isolated from an external environment that is integrally protected against the risks of contamination both for the outside critical line and for the inside critical line, and that does not have the drawbacks or the boundaries of the partial solutions proposed thus far.

For this purpose and according to a first aspect, the invention has as its object a sealed junction device between a first chamber and a second chamber that are isolated from the external environment, such as:

Being part of a first chamber:
  A structure that includes a first wall that borders a first inside space is equipped with a first opening that is bordered by a first annular flange;
  A first door that is supported by the structure by means of the movable or deformable carrying means, of which the panel is arranged and mounted so as to be able to be moved to be either in the closed state where it works with the first flange by closing the first opening or in the open state where it is detached from the first flange and placed in the inside space by opening the first opening;

Being part of a second chamber:
  A second wall is equipped with a second opening that is bordered by a second annular flange;
  A second door of which the panel is arranged and mounted to move, able to be in the closed state or in the open state, where, respectively, the second panel closes or opens the second opening;

The first flange and the second flange are complementary and able to be held in a removable way, flattened against one another by their end surfaces by removable holding means;

The first panel and the second panel are complementary and able to be flattened against one another, hermetically sealed, by their outside surfaces;

Removable interlocking means are able to hold the two panels in a removable way, flattened against one another in a hermetically-sealed way by their outside surfaces;

Movement actuation means are able to move the first panel between its closed and open states, and monitoring means are able to monitor the movement actuation means;

Such that when the first door and the second door, respectively their panels, are in the open state, the first chamber and the second chamber are in communication with one another via their respective openings in the open state, with a communication space that consists of an entrance/exit space in the first chamber and an entrance/exit space in the second chamber being made between the two chambers that make it possible to pass certain contents from one to the other;

An inside critical annular line of contamination risk exists on the first panel of the first door, and an outside critical annular line of contamination risk exists on the second flange;

And protective means are provided against the risks of contamination for the outside critical line.

This device comprises means that are structurally integrated into the first door and/or means that are structurally integrated into the second flange, able—when the first door and the second door, respectively their panels, are in the open state—to form a separation between the communication space and the inside critical annular line and the outside critical annular line.

According to another characteristic, the structurally integrated means that can form a separation constitute protective means against any contamination at the location of the inside critical annular line and/or the outside critical annular line.

According to one embodiment, the structurally integrated means are completely integrated into the first door and/or into the second flange.

According to a first embodiment, the structurally integrated means that can form a separation come in the form of an annular deflector that is placed between the communication space and the critical line, whereby the latter thus normally cannot be reached during the passage into the communication space.

According to a second embodiment, the structurally integrated means that can form a separation come in the form of a separation space of appropriate size, placed between the communication space and the critical line, whereby the latter thus normally cannot be reached during the passage into the communication space.

As appropriate, one or the other or both embodiments exist.

According to a first variant embodiment, the structurally integrated means that are able to form a separation come in the form of an annular deflector that is integrated into the second flange, bordering the second opening and projecting from the free frontal plane of the second flange that forms an interface with the first flange.

According to one possibility, the annular deflector has a general cylindrical shape or a slightly tapered free distal edge, or it forms an annular cavity with the outside peripheral part of the second flange in the bottom or in the vicinity of the bottom of which the critical line is located.

According to one possibility, the panel of the second door comprises an annular groove that opens toward the inside of the second chamber, able to accommodate the deflector of the second flange, for example, able to comprise—toward the inside—the annular groove, and to form toward the outside a part in the shape of a tenon that can be housed in a complementary part in the shape of a mortise provided on the outside surface of the panel of the first door.

According to a second variant embodiment, the structurally integrated means that can form a separation come in the form of an annular deflector that is integrated into the first door, supported by or being part of the carrying means or movement actuation means of the first door or panel of the first door in the open state and arranged around the first door.

According to several possibilities, the annular deflector has a general cylindrical shape and with a central part of the carrying means or movement actuation means of the first door forms a cavity for protection of the inside critical line with a larger axial size, in particular a considerably larger size, than the axial space requirement of the panel of the first door or the axial space requirement of the unit that comprises the panel of the first door and the panel of the second door flattened on the panel of the first door.

According to one possibility, the carrying means and the movement actuation means of the first door are means to rotate around an axis that is at least approximately parallel to the first opening, and the first flange. This axis is, for example, separated in the inside space of the first chamber in such a way as to allow the deflector—in the open state of the first panel—to be placed between the central part of the carrying means or the movement actuation means and the inside surface of the wall of the first chamber around the first opening. This axis, however, is separated laterally from the panel of the first door, in such a way as to separate the deflector, the panel of the first door, and the inside critical line of the communication space when the first panel is in the open state.

According to a third variant embodiment, the structurally integrated means that can form a separation come in the form of a separation space of appropriate size, with the carrying means and the movement actuation means of the first door being arranged in such a way that in the open state of the first panel, the first panel is substantially separated beyond the boundary of the first entrance/exit space, with the separation space thus being made between the first entrance/exit space and the first panel in the open state.

According to different possibilities, the first door is supported by means of carrying means in such a way that the first panel is arranged and mounted so as to be able to be moved to be located, in the open state, either in a primary open state where a primary separation space is made or in a final open state where a final separation space is made, larger than the primary separation space.

As appropriate, the separation space is located beyond the lateral boundary or beyond the distal end boundary of the entrance/exit space of the first chamber, opposite to the first opening, and to the first flange.

According to one possibility, the separation space is an empty space. According to another possibility, a stationary or movable separation wall is provided for the first chamber, said wall which, in the open state of the first panel, is placed and extends, at least partly, between the first panel and the first entrance/exit space.

According to the possibilities, in the open state of the first panel, the separation between any area of the first panel and the closest boundary of the first entrance/exit space is at least equal to one-fourth, more particularly is at least equal to one-half, and more particularly still is at least equal to the size of the first entrance/exit space computed in the direction of this separation.

According to the possibilities, in the open state of the first panel, the first panel is arranged in a position that is at least approximately parallel or at least approximately orthogonal to the first opening, the first flange, and the position of the first panel in the closed state.

According to the possibilities, in the open state of the first panel, the first panel is arranged in a position that is at least approximately opposite or in a lateral position in relation to the first opening, the first flange, and the position of the first panel in the closed state.

According to the possibilities, the carrying means and the movement actuation means of the first door are arranged to be able to move the first panel between its closed and open or primary open states, in a movement that comprises an initial movement of separation from the first panel of the first flange, which is an at least essentially initial translational movement along an axis that is at least approximately orthogonal to the first opening, the first flange, and the position of the first panel in the closed state, or an initial rotational movement around an axis that is at least approximately parallel to the first opening, the first flange, and the position of the first panel in the closed state.

According to the possibilities, the carrying means and the movement actuation means of the first door are arranged to be able to move the first panel between its closed and open or primary open and final open states, in a movement that comprises an initial movement of separation of the first panel from the first flange and at least a subsequent movement that is a subsequent translational movement and/or at least one subsequent rotational movement.

According to the possibilities, the carrying means and the movement actuation means of the first door are arranged to be able to move the first panel in a subsequent translational movement along an axis of translation that is at least approximately rectilinear or curvilinear, or in a subsequent rotational movement around an axis that is at least approximately parallel to or at least approximately orthogonal to the first opening, the first flange, and the position of the first panel in the closed state.

According to a first family of embodiments, the carrying means and the movement actuation means of the first door are arranged to be able to move the first panel from its closed state in a movement that comprises an initial translational movement along an axis that is at least approximately orthogonal to the first opening, the first flange, and the position of the first panel in the closed state, to separate the first panel from the first flange, and at least one subsequent translational movement along an axis that is at least approximately parallel to the first opening, the first flange, and the position of the first panel in the closed state and/or a rotational movement around an axis that is at least approximately orthogonal to the first opening, the first flange, and the position of the first panel in the closed state, to bring the first panel into its position in the open or primary open or final open state, where it is then arranged in a lateral position in relation to the first opening, the first flange, and the position of the first panel in the closed state, at least approximately orthogonal to the axis of the first entrance/exit space, with the separation space being located beyond the lateral boundary of the first entrance/exit space.

According to a second family of embodiments, the carrying means and the movement actuation means of the first door are arranged to be able to move the first panel from its closed state in a movement that comprises at least one translational movement along an axis that is at least approximately orthogonal to the first opening, the first flange, and the position of the first panel in the closed state, for separating the first panel from the first flange, and then to bring the first panel into its position in the open, primary open, or final open state, where it is then arranged in a position that is at least approximately opposite the first opening, the first flange, and the position of the first panel in the closed state, at least approximately orthogonal to the axis of the first entrance/exit space, whereby the separation space is located beyond the end boundary of the entrance/exit space that is opposite to the first opening and the first flange.

According to a third family of embodiments, the carrying means and the movement actuation means of the first door are arranged to be able to move the first panel from its closed state in a movement that comprises a rotational movement around an axis that is at least approximately parallel to the first opening, the first flange, and the position of the first panel in the closed state, to bring the first panel into its position in the open or primary open or final open state where it is then arranged in a lateral position in relation to the first opening, the first flange, and the position of the first panel in the closed state, at least approximately orthogonally to the axis of the first entrance/exit space, whereby the separation space is located beyond the lateral boundary of the first entrance/exit space.

According to a fourth family of embodiments, the carrying means and the movement actuation means of the first door are arranged to be able to move the first panel from its closed state in a movement that comprises a translational movement along a curvilinear axis that corresponds at least approximately to an arc with an axis that is at least approximately parallel to the first opening, the first flange, and the position of the first panel in the closed state, to bring the first panel into its position in the open or primary open or final open state where it is then arranged in a lateral position in relation to the first opening, the first flange, and the position of the first panel in the closed state, at least approximately orthogonally to the axis of the first entrance/exit space, with the separation space being located beyond the lateral boundary of the first entrance/exit space.

According to a second aspect, the invention has as its object a process for implementing a sealed junction device as just described, comprising the following successive operating stages:

A first chamber of which the first door that comprises a first panel is in the closed state, and a second chamber of which the second door that comprises a second panel is in the closed state are available;

The two chambers are brought into proximity with one another, and the first flange and the second flange are flattened against one another, hermetically sealed, by their outside surfaces, and the first panel of the first door and the second panel of the second door are brought to be flattened against one another, hermetically sealed;

The first flange and the second flange and the two panels are made integral, and the first panel is actuated to move it and to bring it into the open state and thus also to bring the second panel into the open state, in such a way that the first chamber and the second chamber are in communication with one another via their respective openings in the open state, with a communication space being made between the two chambers, making it possible to pass certain contents between them.

This process is such that when the first panel of the first door and the second panel of the second door are in the open state, the means that are structurally integrated into the first door and/or the means that are structurally integrated into the second flange are implemented, and a separation is formed between the communication space and the inside critical annular line and the outside critical annular line of the sealed junction device.

According to a third aspect, the invention has as its object a first chamber, specially designed with a second chamber to be part of a device for sealed transfer between the two chambers, comprising:

A structure that includes a first closed wall that borders an inside space,

At least a first opening that is made in the first wall and bordered by a first annular flange of which the outside surface is able to provide the hermetically-sealed flattening on itself of the outside surface of a second complementary flange that is part of the second chamber, Removable holding means, combined at least in part with the first flange, able to hold in a removable way the first flange and the second flange that are flattened against one another by their outside surfaces, A first door that is supported by the structure by means of the movable or deformable carrying means, of which the first panel is arranged and mounted so as to be able to be moved to be either in the closed state where it works with the first flange by closing the first opening or in the open state where it is released from the first flange and placed in the first inside space by opening the first opening, and of which the outside surface is able to ensure the hermetically-sealed flattening on itself from the outside surface of the second panel of a second complementary door that is part of the second chamber, Means for removable interlocking combined at least in part with the first door, able to hold the first panel and the second panel, flattened against one another by their outside surfaces, in a removable way, Movement actuation means that can move the first panel between its closed and open states, and means for monitoring these movement actuation means, And, when the first panel is in the open state, a first entrance/exit space in/of the first inside space, in the general shape of a truncated cylinder, cone or pyramid, extending into the first inside space at least approximately axially from the first opening, and the first flange, whereby this first entrance/exit space is part of a communication space between the two combined chambers and is able to make it possible to pass certain contents into/out of the first inside space, from one to the other of the two chambers, Able to be attached to the second chamber by a sealed junction device as described, And comprising means that are structurally integrated into the first door that are able, when it is in the open state, to form a separation between the communication space and the inside critical annular line.

According to a first embodiment, the means that are structurally integrated into the first door come in the form of an annular deflector that is supported by or is part of the carrying means of the first door or the first panel of the first door in the open state and arranged around the first door.

In this first embodiment, the deflector can have a larger axial size, in particular a considerably larger size, than the axial space requirement of the first panel and can form a cavity for protection of the inside critical line with a central part of the carrying means of the first door.

In this first embodiment, the carrying means of the first door can be carrying means to rotate around an axis that is approximately parallel to the first flange. For example, this axis of rotation is separated from the first flange toward the inside of the first chamber in such a way as to make it possible for the deflector to be placed between the central part of the carrying means and the inside surface of the wall of the first chamber, around the first opening. This axis of rotation can be separated laterally from the first panel, in such a way as to separate the deflector, the first panel, and the inside critical line of the communication space when the first door is in the open state.

According to a second embodiment, the means that are structurally integrated into the first door come in the form of a separation space of appropriate size, with the carrying means and the movement actuation means of the first door being arranged to be able to move the first panel between its closed and open or primary open and final open states in such a way that in the open state of the first panel, the first panel is substantially separated beyond the boundary of the first entrance/exit space for making this separation space between the first entrance/exit space and the first panel in the open state.

According to the modes of execution of this second embodiment, the carrying means and the movement actuation means of the first door comprise initial separation means of the first panel from the first flange that are translational means along an axis that is at least approximately orthogonal to the first opening, the first flange, and the position of the first panel in the closed state, or rotational means around an axis that is at least approximately parallel to the first opening, the first flange, and the position of the first panel in the closed state. However, the carrying means and the movement actuation means comprise initial separation means of the first panel from the first flange and subsequent movement means that are translational means and/or rotational means.

For example, the carrying means and the movement actuation means comprise subsequent translational movement means along an axis of translation that is at least approximately rectilinear or curvilinear or subsequent rotational means around an axis that is at least approximately parallel to or at least approximately orthogonal to the first opening, the first flange, and the position of the first panel in the closed state.

According to one possibility, the first panel is extended laterally projecting, in an at least essentially coplanar way, by at least one mechanism plate that is part of the carrying means and that makes possible the movement of the first panel as a result of the implementation of the movement actuation means.

According to one possibility, the first wall comprises one or more through slots that can allow sealed and aseptic passage of carrying means and/or movement actuation means.

In the second embodiment (separation space) and according to a first family, the carrying means and the movement actuation means comprise at least a first actuator that is arranged along an axis that is at least approximately orthogonal to the first opening, the first flange, and the position of the first panel in the closed state and that ensures the initial translational movement and either at least a second actuator along an axis that is at least approximately parallel to the first opening, the first flange, and the position of the first panel in the closed state, or at least one rotational movement system along an axis that is at least approximately orthogonal to the first opening, the first flange, and the position of the first panel in the closed state.

According to the possible embodiments of this first family, the initial course of translational movement is just that necessary, aside from the necessary degrees of play, to make possible subsequent translational or rotational movement, without the first panel interfering with the first wall of the first chamber on its inside surface. In its open or primary open or final open state, the outside surface of the first panel is turned toward and close to the inside surface of the first wall of the first chamber. The first panel is extended laterally projecting by at least one mechanism plate that is supported at least approximately orthogonally by the at least one first actuator that passes through the at least one through slot of the first wall with the at least one first actuator being supported by the at least one second actuator or the at least one rotational movement system.

In the second embodiment (separation space) and according to a second family, the carrying means and the movement actuation means comprise at least one actuator that is arranged along an axis that is at least approximately orthogonal to the first opening, the first flange, and the position of the first panel in the closed state.

According to the possible embodiments of this second family, the course of translational movement is that necessary to the production of the separation space and, in its open or primary open or final open state, the outside surface of the first panel is turned toward and removed from the first opening and the first flange.

In the second embodiment (separation space) and according to a third family, the carrying means and the movement actuation means comprise at least one rotational movement system along an axis that is at least approximately parallel to the first flange and to the position of the first panel in the closed state.

According to the possible embodiments of this third family, the course of rotational movement is close to a half-turn; in its open or primary open or final open state, the outside surface of the first panel is turned opposite the inside surface of the first wall of the first chamber, and the first panel is extended laterally projecting by a mechanism plate that is supported by the rotational movement system.

In the second embodiment and according to a fourth family, the carrying means and the movement actuation means comprise at least one system with a deformable parallelogram along an axis that is at least approximately parallel to the first flange and to the position of the first panel in the closed state.

According to the possible embodiments of this fourth family, the course of rotational movement of the deformable parallelogram is on the order of a half-turn, and in its open or primary open or final open state, the outside surface of the first panel is turned toward the inside surface of the first wall of the first chamber.

According to a fourth aspect, the invention has as its object a second chamber, specially designed to be part of a first chamber of a sealed transfer device between the two chambers, Comprising:
A second wall that is equipped with a second opening that is bordered by a second annular flange,
A second door of which the panel is arranged and mounted to move, able to be in the closed state or in the open state or, respectively, the second panel closes or opens the second opening,
Able to be attached to the first chamber by a sealed junction device as described above,
And comprising suitable means that are structurally integrated into the second flange that can, when the second door, respectively the second panel, is in the open state, form a separation between the communication space and the outside critical annular line.

According to one embodiment, the means that are structurally integrated into the second flange come in the form of an annular deflector that borders the second opening, projecting from the free frontal plane of the second flange that forms an interface with the first flange.

According to the embodiments, the annular deflector has a general cylindrical shape or a slightly tapered free distal edge, and with the outside peripheral part of the second flange, it forms an annular cavity in the bottom or in the vicinity of the bottom of which the outside critical line is located.

According to the embodiments, the panel of the second door comprises an annular groove that opens toward the inside of the second chamber, able to accommodate the deflector of the second flange, and the panel of the second door comprises a rounded annular peripheral part that can comprise the annular groove toward the inside and that can form a part in the shape of a tenon toward the outside.

According to a fifth aspect, the invention has as its object a device for sealed transfer between a first chamber as described and a second chamber as described, comprising a sealed junction device between the two chambers that is equipped with means that are structurally integrated into the first door and/or means that are structurally integrated into the second flange, able—when the first door and the second door, respectively the panels of the doors, are in the open state—to form a separation between the communication space and the inside critical annular line and/or the outside critical annular line.

According to a sixth aspect, the invention has as its object a process for implementing a sealed transfer device between a first chamber and a second chamber comprising a sealed junction device, as described, which comprises the following successive operating stages:

A first chamber of which the first door, respectively the first panel, is in the closed state and a second chamber of which the second door, respectively the second panel, is in the closed state, are available, with one of the chambers originally containing certain contents;

The sealed junction device is implemented as described;

Once the first door and the second door, respectively the panels, are in the open state and the first chamber and the second chamber are in communication with one another via a communication space, certain contents of the chamber where they are located are passed to the other chamber, without the certain contents, during this transfer between the two chambers, being in contact with the inside critical annular line and/or the outside critical annular line;

Once this transfer is done, the first door and the second door, respectively the panels, are brought into the closed state;

Then, the two chambers are separated.

According to the embodiments, the certain contents are originally in the first chamber or they are originally in the second chamber.

Several embodiments of the invention will now be described using drawings, in which:

FIG. 1 is a cutaway view through an axial plane of a sealed junction device between a first chamber and a second chamber that are partially shown, whereas the two chambers are close to one another but not yet flattened, with the panels of the two doors of the two chambers being in the closed state, the sealed junction device comprising, in this embodiment, means that are structurally integrated into the second flange and in the form of a deflector, able—when the first door and the second door are in the open state—to form a separation between the communication space and the outside critical annular line.

Figure 6:
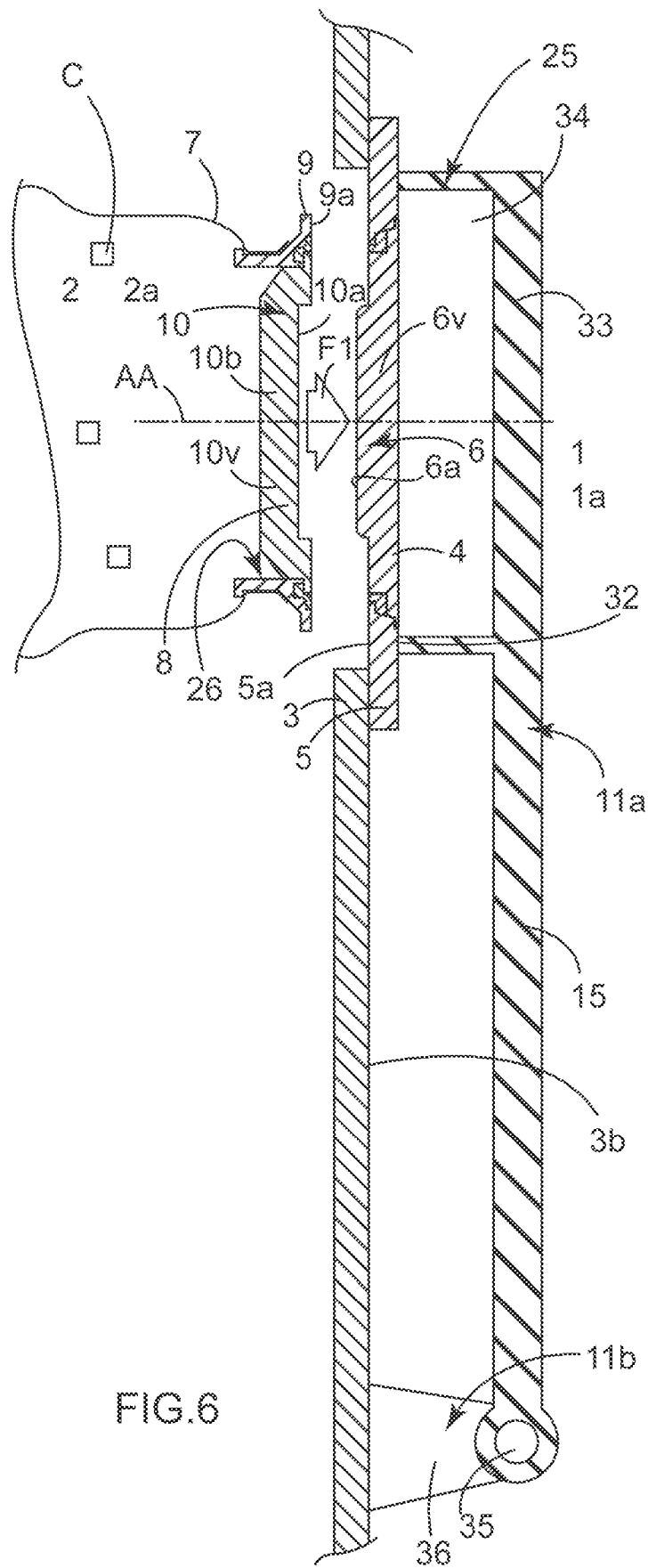

FIG. 6 is a cutaway view through an axial plane of a sealed junction device between a first chamber and a second chamber that are shown partially, whereas the two chambers are close to one another but not yet flattened, with the panels of the two doors of the two chambers being in the closed state, the sealed junction device comprising, in this other embodiment, means that are structurally integrated into the first door and in the form of a deflector, able—when the first door and the second door are in the open state—to form a separation between the communication space and the critical lines.

Figure 7:
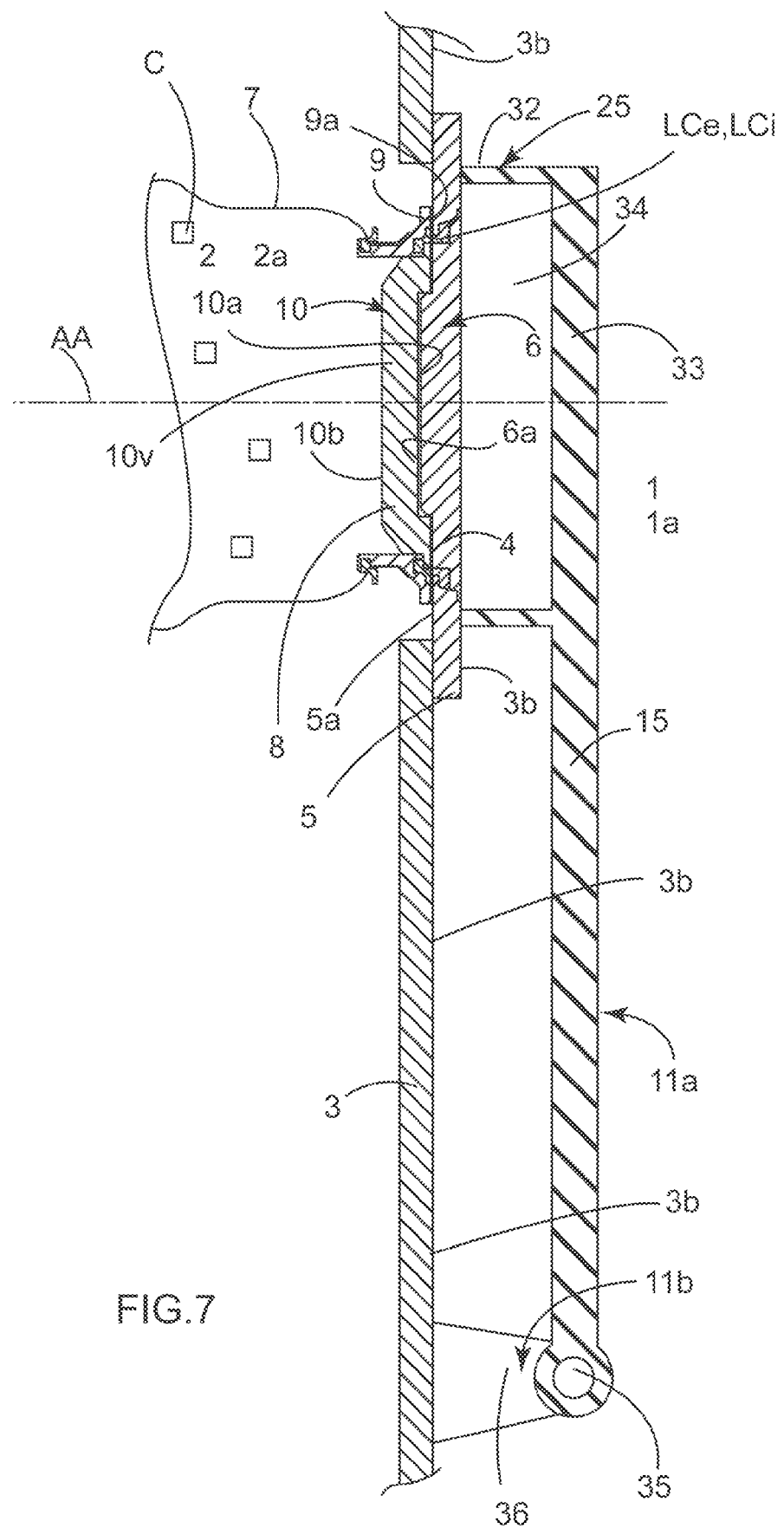

FIG. 7 is a view that is analogous to that of FIG. 6, whereas the two flanges and the panels of the two doors of the two chambers are applied on one another, with the panels of two doors of the two chambers being in the closed state.

Figure 8:
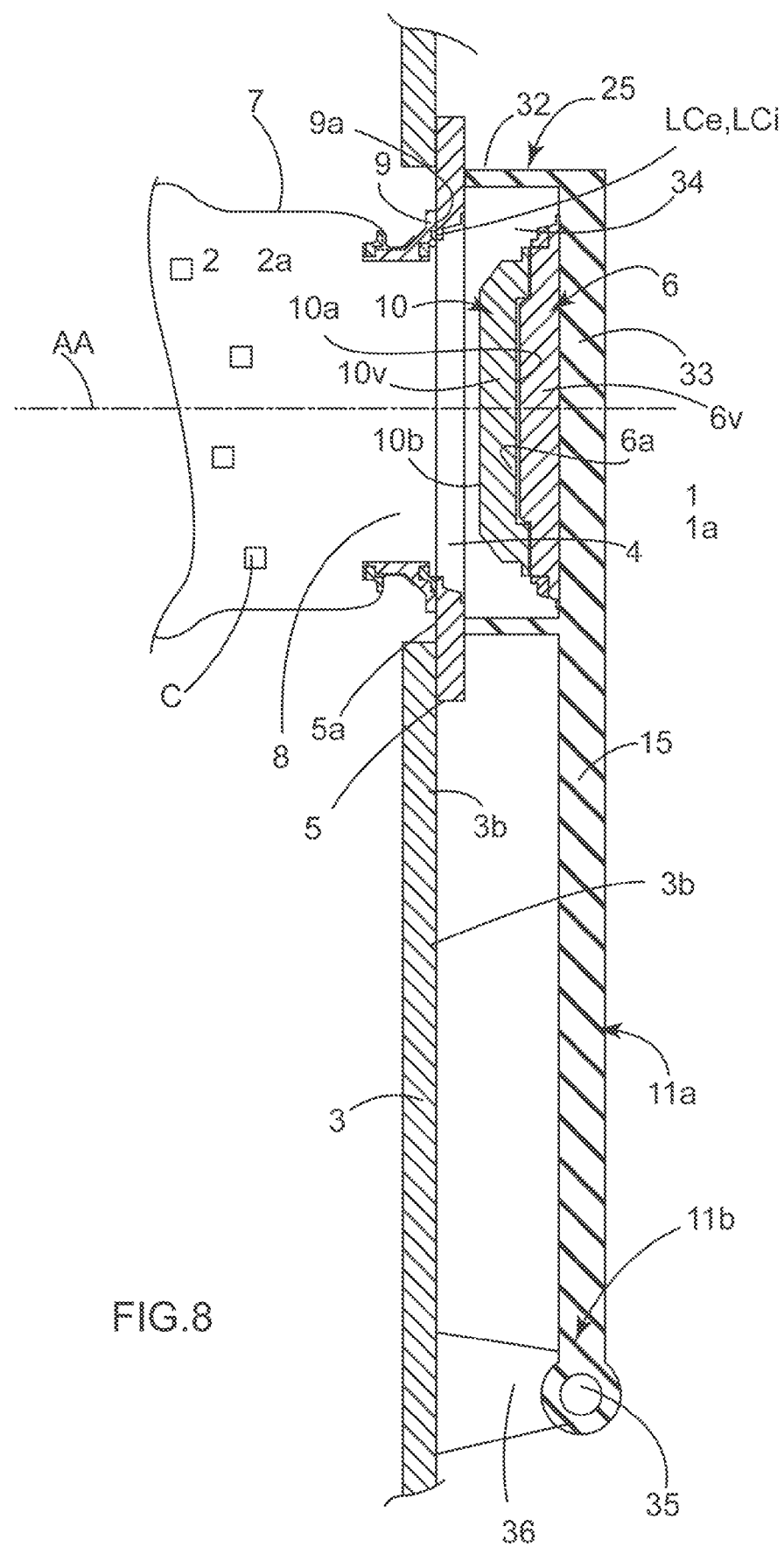

FIG. 8 is a view that is analogous to that of FIG. 7, whereas the panel of the second door is applied and held by the panel of the first door, which was separated from the first flange, but is not fully open.

Figure 9:
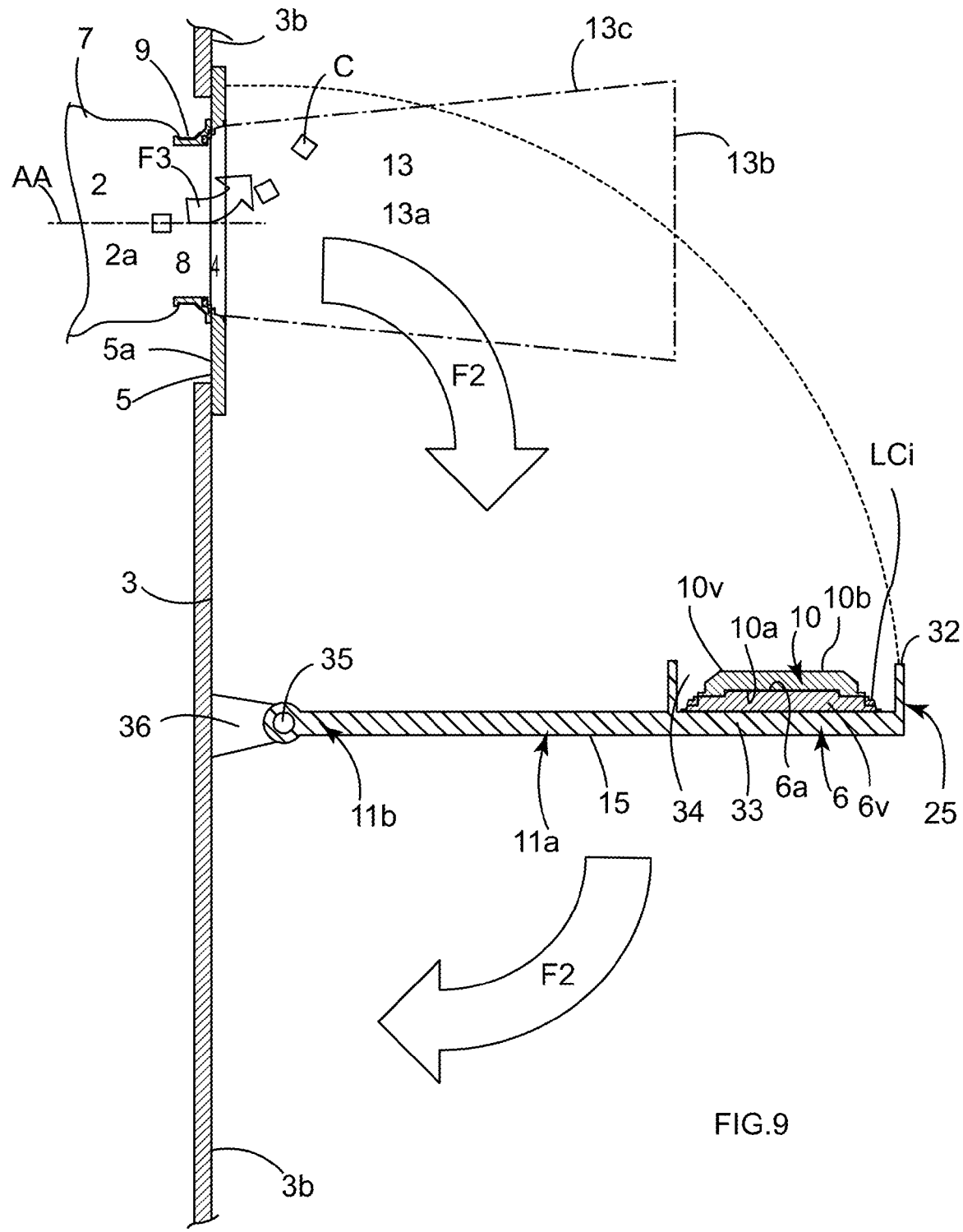

FIG. 9 is a view that is analogous to that of FIG. 8, whereas the panels of the two doors are in a state that is intermediately open, but not fully open.

Figure 10:
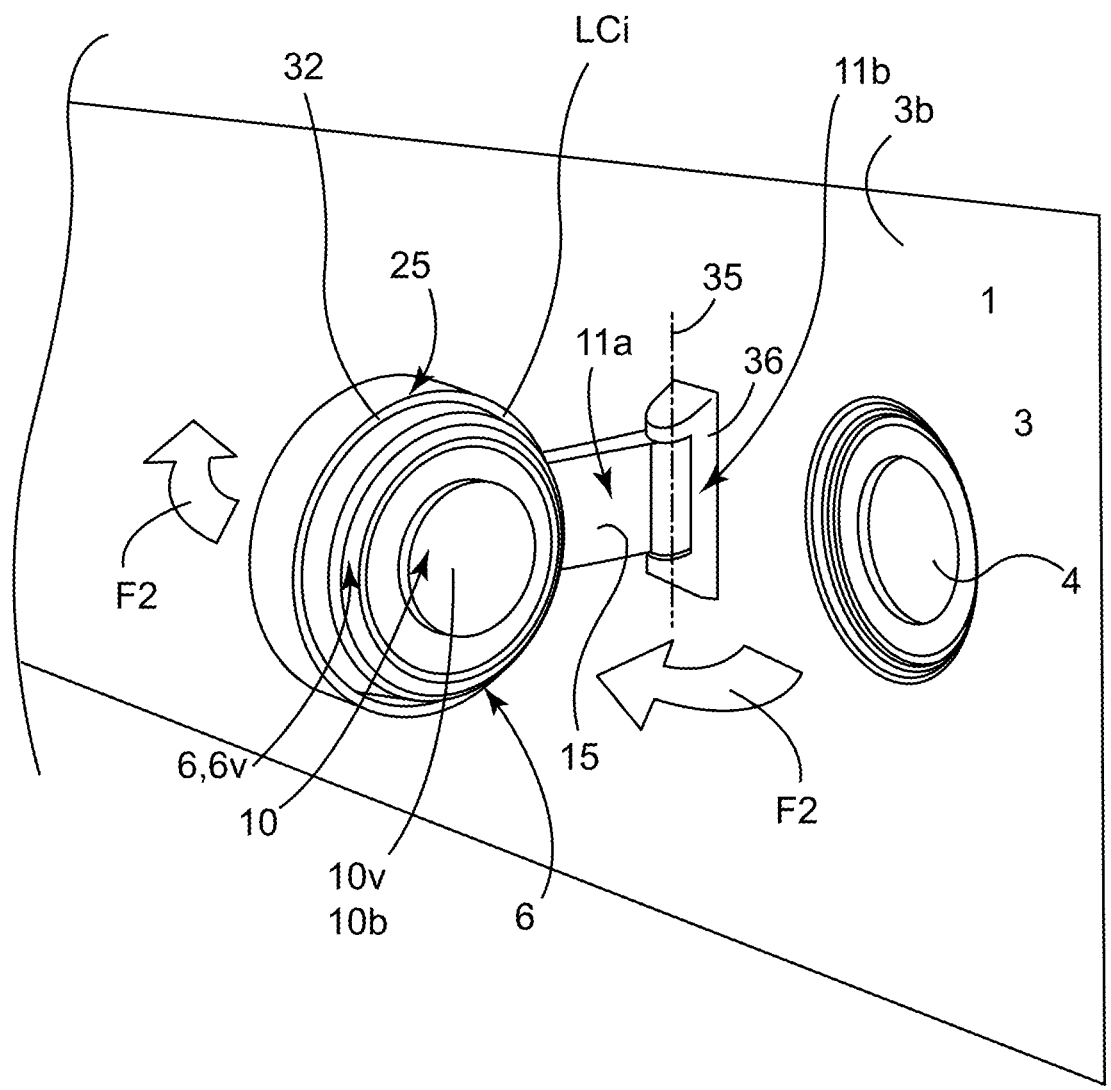

FIG. 10 is a perspective view from the inside of the first chamber, essentially in the same situation as that of FIG. 9.

Figure 11:
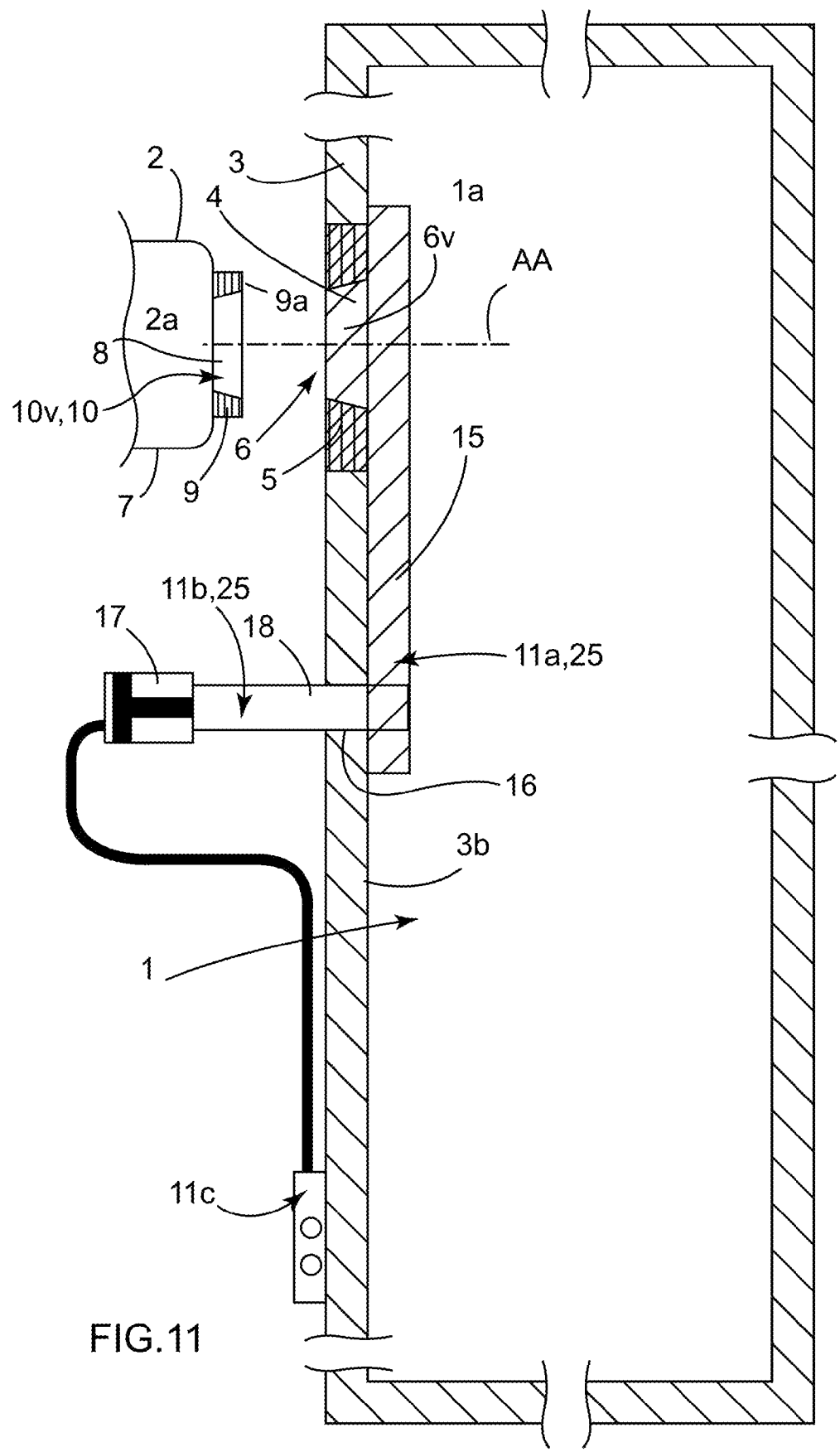

FIG. 11 is a cutaway view through an axial plane, a sealed junction device between a first chamber and a second chamber that are shown partially, whereas the two chambers are close to one another but not yet flattened, with the panels of the two doors of the two chambers being in the closed state, the sealed junction device comprising in this other embodiment means that are structurally integrated into the first door and in the form of a separation space of appropriate size, placed between the communication space and the inside critical line, able—when the first door and the second door are in the open state—to form a separation between the communication space and the inside critical annular line, according to an implementation in which the carrying means and the movement actuation means of the first door are arranged to be able to move the first panel, supporting the second panel, from its closed state in an initial translational movement along an axis that is orthogonal to the first opening, the first flange, and the first panel when it is in the closed state, and a subsequent rotational movement around an axis that is orthogonal to the first opening, the first flange, and the first panel when it is in the closed state.

FIG. 12 is a diagram that corresponds to FIG. 11, whereas the two flanges and the panels of the two doors of the two chambers are applied on one another, with the panels of the doors of the two chambers being in the closed state.

FIG. 13 is a diagram that is analogous to FIG. 12, whereas the second flange is assembled with the first flange and the panel of the second door that is assembled with the panel of the first door once the initial translational movement is carried out but before the subsequent rotational movement is made, with the panel of the first door and the panel of the second door being separated from the first flange, without the panel of the first door already being in the fully open state.

FIG. 14 is a diagram that is analogous to FIGS. 12 and 13, once the rotational movement is partially but not completely carried out, with the panel of the first door not yet being in the fully open state.

Figure 15:
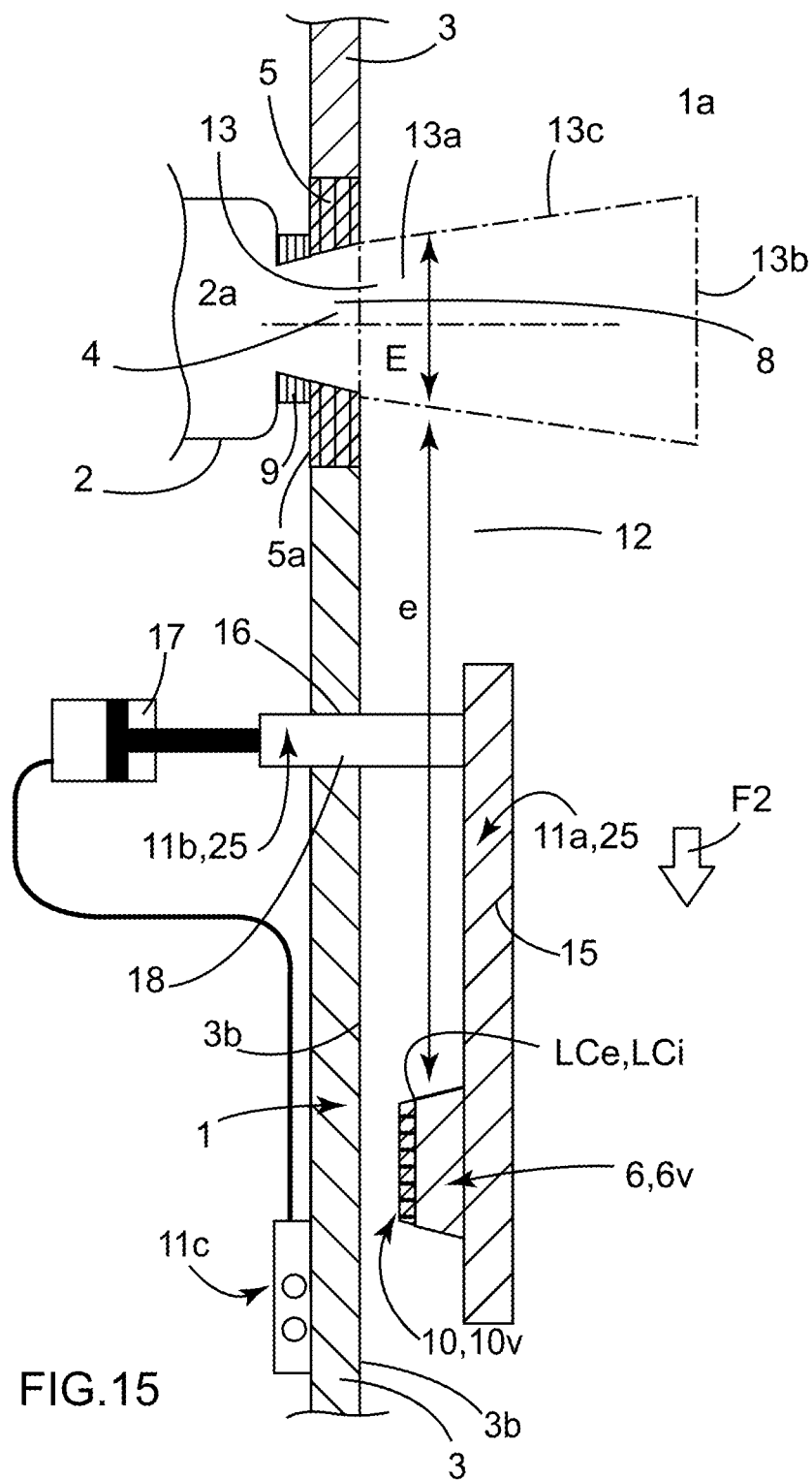

FIG. 15 is a diagram that is analogous to FIGS. 12 and 14, once the rotational movement is completely carried out, with the panel of the first door being in the open state, like the panel of the second door, where it is arranged in a lateral position in relation to the first opening, the first flange, and the first panel when it is in the closed state, at least approximately orthogonal to the axis of the entrance/exit space, with the separation space being located beyond the lateral boundary of the first entrance/exit space.

Figure 16A:
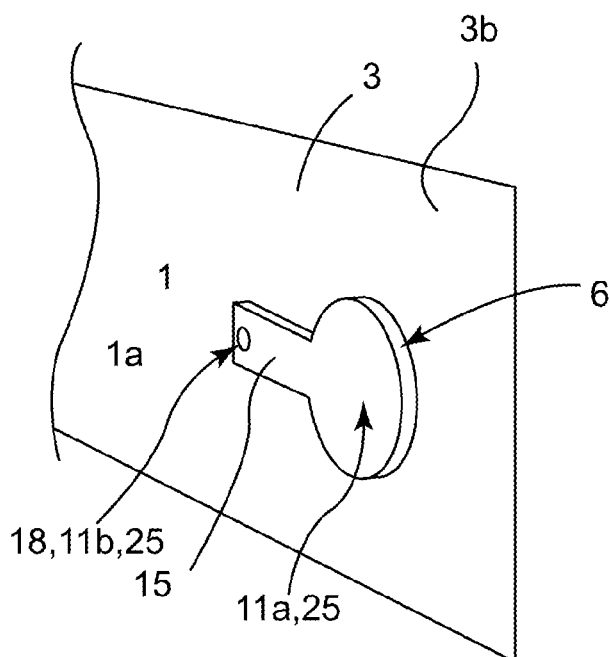
Figure 16B:
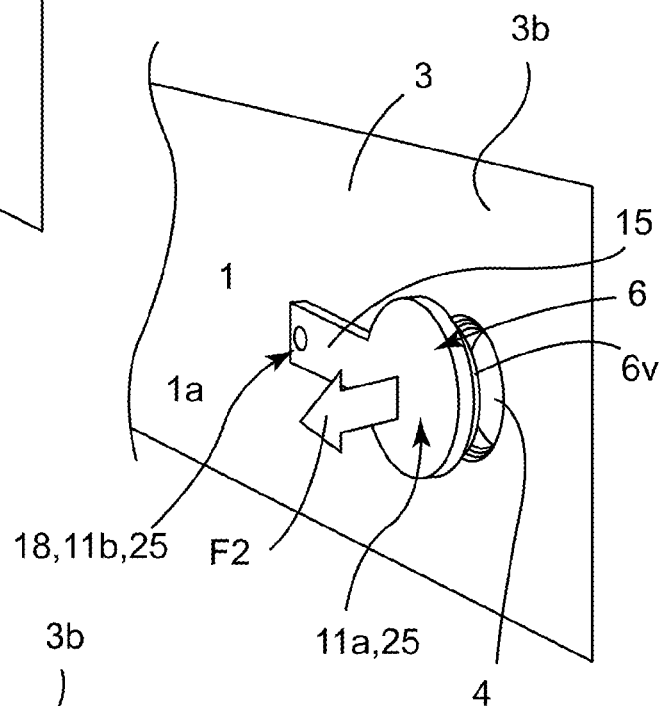
Figure 16C:
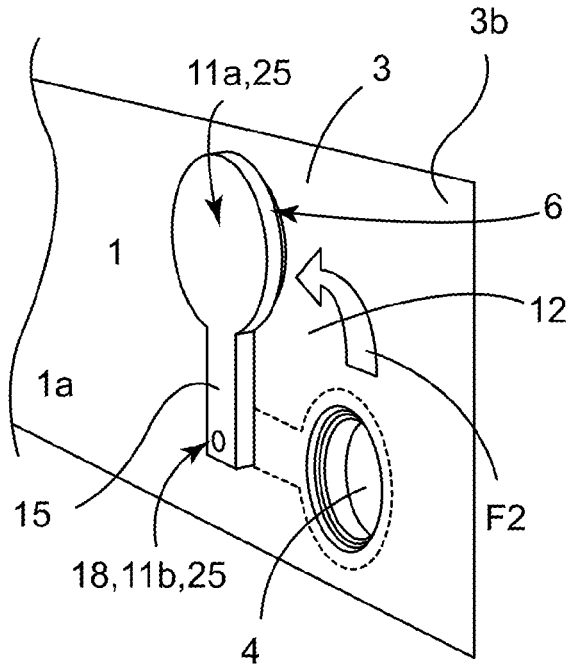

FIGS. 16A, 16B and 16C are three partial perspective views, from the inside of the first chamber in the case where the separation space is an empty space.

Figure 17A:
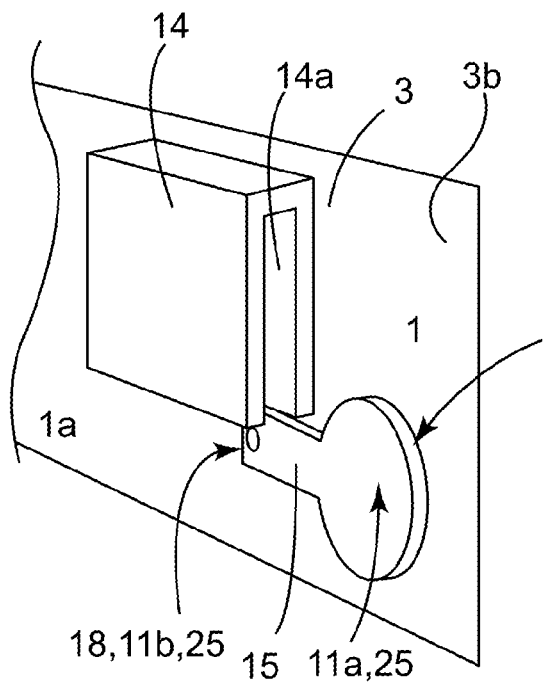
Figure 17B:
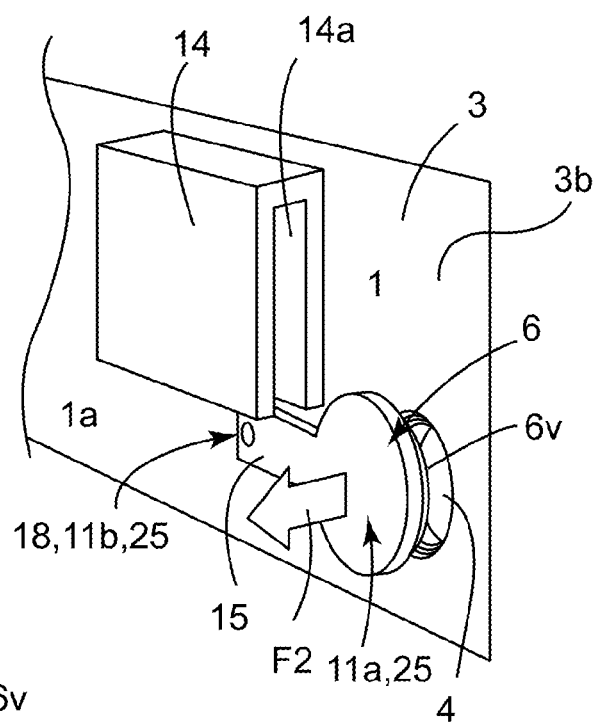
Figure 17C:
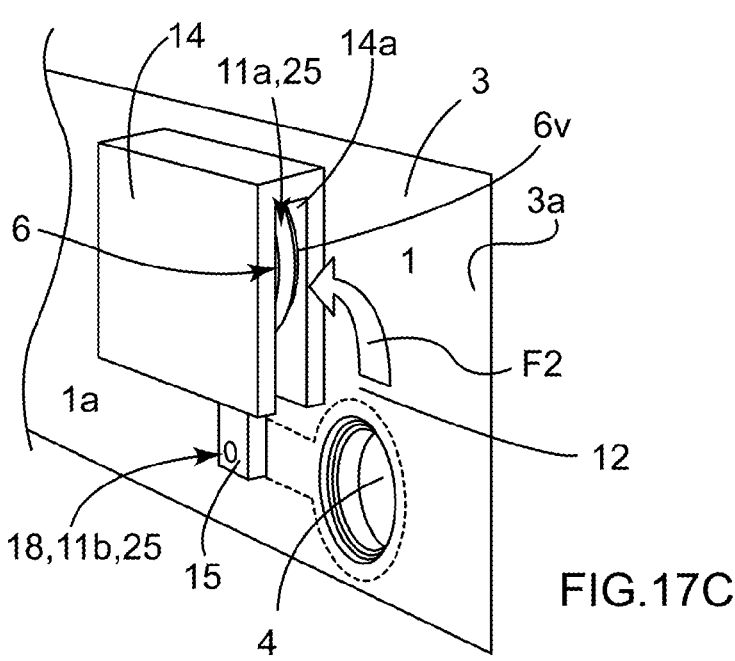

FIGS. 17A, 17B and 17C are three views that are analogous to FIGS. 16A, 16B and 16C, in the case where the first chamber also comprises a stationary separation wall that in the open state of the first panel is placed and extends between the first panel and the first entrance/exit space.

FIG. 18 is a diagram that corresponds to FIG. 12 of a sealed junction device between a first chamber and a second chamber, whereas the two flanges and the panels of the two doors of the two chambers are applied to one another, with the panels of the doors of the two chambers being in the closed state, the sealed junction device comprising, in this embodiment, means that are structurally integrated into the first door and, in the form of a separation space of appropriate size, placed between the communication space and the inside critical line, able—when the first door and the second door are in the open state—to form a separation between the communication space and the inside critical annular line, according to an implementation in which the carrying means and the movement actuation means of the first door are arranged to be able to move the first panel, supporting the second panel, from its closed state in an initial translational movement along an axis that is at least approximately orthogonal to the first opening, the first flange, and the first panel when it is in the closed state, and a subsequent translational movement along an axis that is parallel to the first opening, the first flange, and the first panel when it is in the closed state.

FIG. 19 is a diagram that is analogous to FIG. 18, whereas the second flange is assembled with the first flange, and the panel of the second door is assembled with the panel of the first door, once the initial translational movement is made but before the subsequent translational movement is made, with the panel of the first door being separated from the first flange, without also being in the fully open state.

FIG. 20 is a diagram that is analogous to FIGS. 18 and 19, once the translational movement is completely carried out, with the panel of the first door being in the open state, like the panel of the second door, where it is arranged in a lateral position in relation to the first opening, the first flange, and the first panel when it is in the closed state, at least approximately orthogonal to the axis of the first entrance/exit space, with the separation space being located beyond the lateral boundary of the entrance/exit space.

FIG. 21 is a diagram that corresponds to FIGS. 12 and 18 of a sealed junction device between a first chamber and a second chamber, whereas the two flanges and the panels of the two doors of the two chambers are applied on one another, the panels of the door of the two chambers being in the closed state, the sealed junction device comprising, in this embodiment, means that are structurally integrated into the first door and in the form of a separation space of an appropriate size, placed between the communication space and the inside critical line, able—when the first door and the second door are in the open state—to form a separation between the communication space and the inside critical annular line, according to an implementation in which the carrying means and the movement actuation means of the first door are arranged to be able to move the first panel, supporting the second panel, from its closed state in a translational movement along an axis that is orthogonal to the first opening, the first flange, and the first panel when it is in the closed state.

FIG. 22 is a diagram that is analogous to FIG. 21, whereas the second flange is assembled with the first flange and the panel of the second door that is assembled with the panel of the first door, once the translational movement is partially but not completely carried out, with the panel of the first door not yet being in the fully open state.

Figure 23:
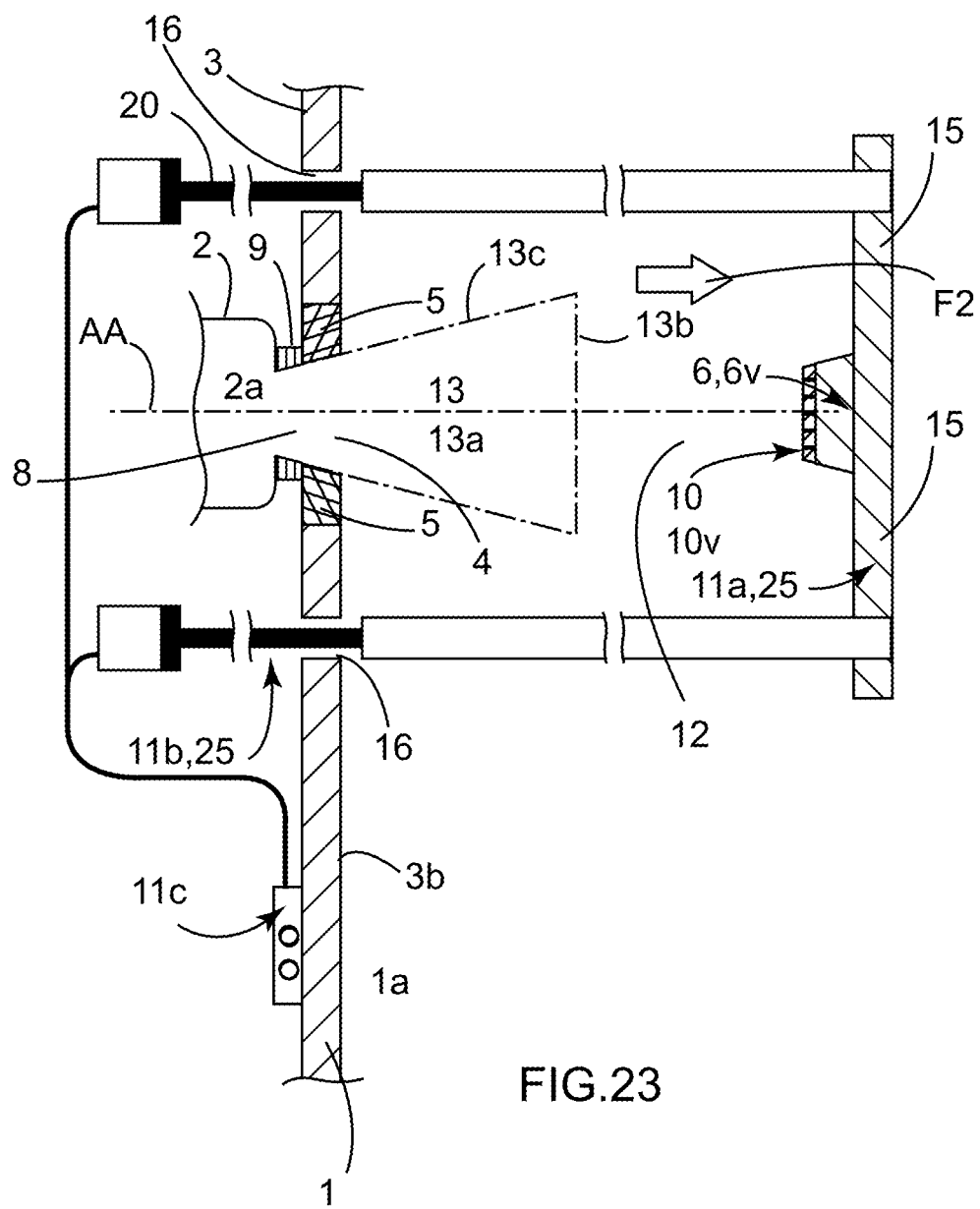

FIG. 23 is a diagram that is analogous to FIGS. 21 and 22, once the translational movement is completely carried out, the panel of the first door being in the open state, like the panel of the second door, where it is arranged in a position that is at least approximately opposite the first opening, the first flange, and the position of the first panel in the closed state, at least approximately orthogonal to the axis of the first entrance/exit space, with the separation space being located beyond the end boundary of the first entrance/exit space opposite to the first opening and the first flange.

FIG. 24 is a diagram that corresponds to FIGS. 12, 18 and 21 of a sealed junction device between a first chamber and a second chamber, whereas the two flanges and the panels of the two doors of the two chambers are applied on one another, with the panels of the doors of the two chambers being in the closed state, the sealed junction device comprising, in this embodiment, means that are structurally integrated into the first door and in the form of a separation space of appropriate size, placed between the communication space and the inside critical line, able—when the first door and the second door are in the open state—to form a separation between the communication space and the inside critical annular line, according to an implementation in which the carrying means and the movement actuation means of the first door are arranged to be able to move the first panel, supporting the second panel, from its closed state in a rotational movement around an axis that is parallel to the first opening, the first flange, and the first panel when it is in the closed state.

FIG. 25 is a diagram that is analogous to FIG. 24, whereas the second flange is assembled with the first flange and the panel of the second door is assembled with the panel of the first door, once the rotational movement is partially but not completely carried out, with the panel of the first door not yet being in the fully open state.

FIG. 26 is a diagram that is analogous to FIGS. 24 and 25, once the rotational movement is completely carried out, with the panel of the first door being in the open state, like the panel of the second door, where it is arranged in a lateral position in relation to the first opening, the first flange, and the first panel when it is in the closed state, at least approximately orthogonal to the axis of the first entrance/exit space, with the separation space being located beyond the lateral boundary of the first entrance/exit space.

Figure 27:
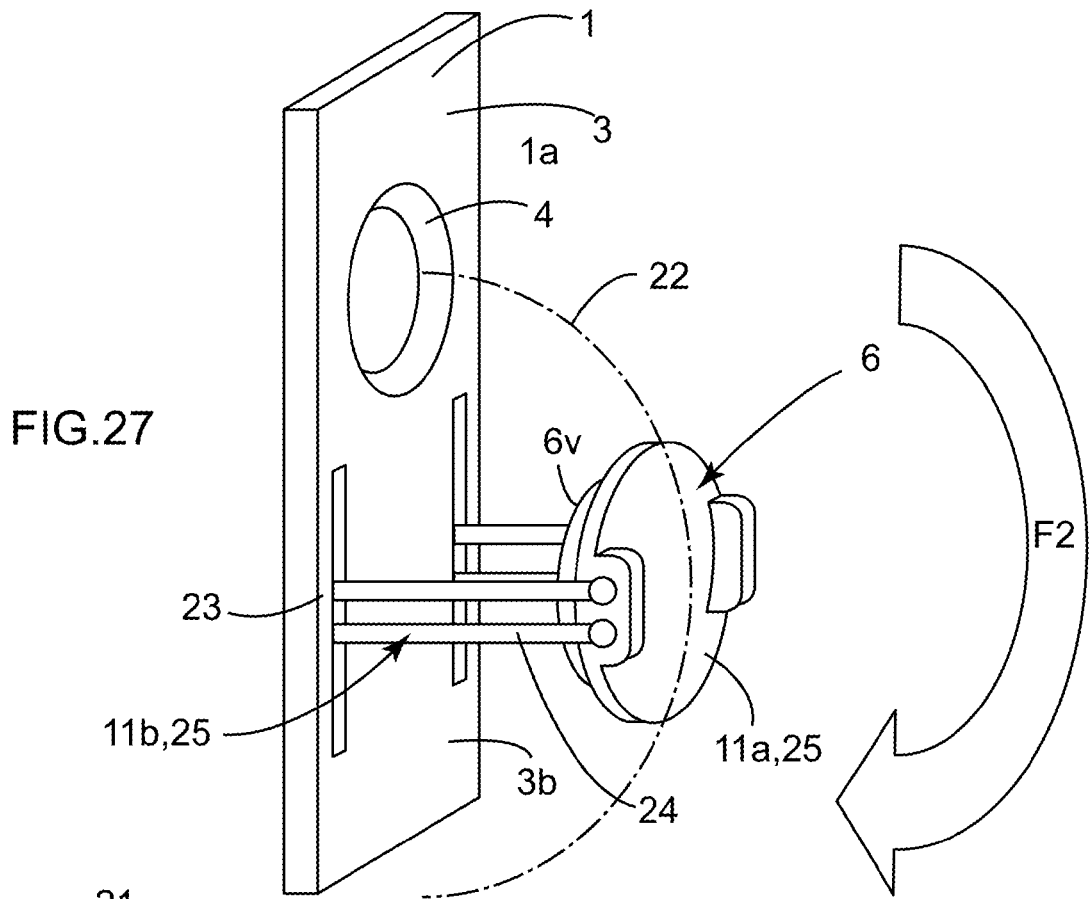

FIG. 27 is a perspective diagram of a sealed junction device between a first chamber and a second chamber, whereas the first panel of the first door is in an intermediate open state, with the sealed junction device comprising, in this embodiment, means that are structurally integrated into the first door and in the form of a separation space of appropriate size, placed between the communication space and the inside critical line, able—when the first door and the second door are in the open state—to form a separation between the communication space and the inside critical annular line, according to an implementation in which the carrying means and the movement actuation means of the first door are arranged to be able to move the first panel, supporting the second panel, from its closed state, in a translational movement along a curvilinear axis.

Figure 28:
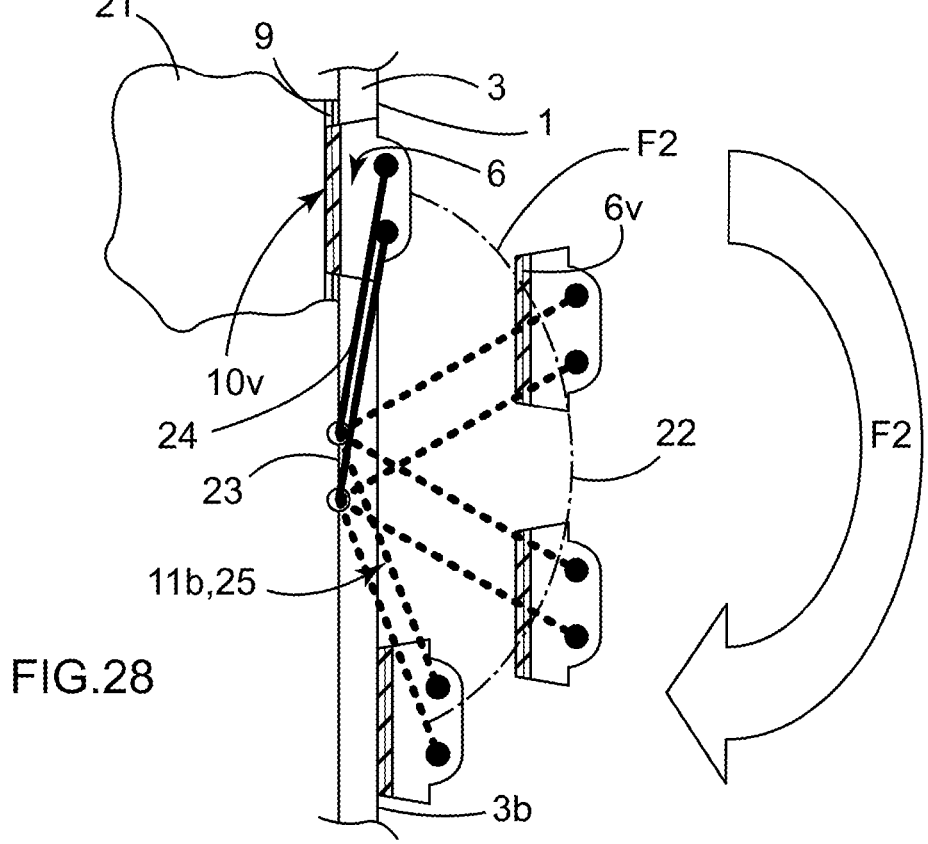

FIG. 28 is a cutaway diagram of the device according to the fourth variant of FIG. 22, when it is in the closed state, in two intermediate open states, and in the open state.

A sealed and aseptic transfer device between a first chamber 1 and a second chamber 2 such as the one under consideration here is called "double-door." By way of example, but not limiting, such a device is of the type of the one that is known under the trademark BIOSAFE® and described in the document EP-A-0688020.

Such a transfer may be necessary in a number of technical fields, in particular but not exclusively the biopharmaceutical field.

The first chamber 1—for example stationary, rigid and of relatively large size—comprises a structure that includes a first closed wall 3, solid and rigid, but equipped with a first opening 4, itself bordered by a first annular flange 5, with an outside surface 5*a*, with one and the other of the opening 4 and the flange 5 being, for example, circular, whereby this embodiment is not limiting. According to one embodiment, the first wall is vertical or inclined to the vertical by an angle on the order of 30° to 45°. The wall 3, having an inside surface 3*b*, borders the inside space 1*a* of the chamber 1.

That which is in or toward the inside space 1*a* that is bordered by the wall 3 is termed "interior" in connection with the first chamber 1. That which is beyond its inside space 1*a* that is bordered by the wall 3 is termed "outside" in connection with the first chamber 1.

The first chamber 1 also comprises a first door 6 that is supported by the structure, in particular by the wall 3, by means of movable or deformable carrying means 11a. The panel 6v of the first door 6 (or first panel 6v) is mounted to move in relation to the first flange 5 that forms a seat, and arranged to be moved and brought either into the closed state where it works with the flange 5 by closing the opening 4 or in the open state, where it is released from the flange 5 and placed in the inside space 1a by opening the opening 4. By synecdoche, it will be said that the first door 6 is mounted to move in relation to the first flange 5 to be in the closed state or in the open state, where, respectively, it closes or opens the first opening 4. The panel 6v comprises an outside surface 6a.

If applicable, the first chamber 1 comprises several first doors such as the first door 6, with the transfer device being part of an operating line that is suitable for making it possible to implement one or more operations before and/or after the transfer, such as manufacturing, treatment, handling, use, measurement, monitoring, analysis, or the like . . . .

The second chamber 2—for example, a movable pouch that is disposable, at least partially flexible and of a smaller size—comprises a structure that includes a second closed wall 7, solid and flexible, but equipped with a second opening 8, itself bordered by a second annular flange 9, with the outside surface 9a, one and the other of the opening 8 and the flange 9 being, for example, circular, with this embodiment not being limiting. The wall 7 borders the inside space 2a of the chamber 2.

That which is in or toward its inside space 2a that is bordered by the wall 7 is termed "interior" in connection with the second chamber 2. That which is beyond its inside space 2a that is bordered by the wall 7 is termed "outside" in connection with the second chamber 2.

The second chamber 2 also comprises a second door 10, having a second panel 10v, an outside surface 10a and an inside surface 10b. The panel 10v, mounted to move in relation to the second flange 9 that forms a seat, and arranged to be in the closed state or in the open state, where, respectively, it closes or opens the second opening 8. As above, by synecdoche, it will be said that the second door 10 is mounted to move in relation to the second flange 9 to be in the closed state or in the open state, where, respectively, it closes or opens the second opening 8.

The sealed and aseptic transfer device is such that several second chambers, such as the second chamber 2, can be combined with the same first chamber 1, when necessary, successively if the first chamber 1 comprises a single opening and a single door 4 and 6 and/or simultaneously if the first chamber 1 comprises several openings and doors 4 and 6.

One of the chambers 1, 2 originally contains certain contents C. For example, certain contents C are originally in the first chamber 1 or in the second chamber 2, with the object of the transfer being to bring said contents finally, respectively, into the second chamber 2 or into the first chamber 1, and in so doing passing the certain contents C into a communication space 13 that is made between the two chambers 1 and 2.

The certain contents C have as a characteristic to have a purpose to be, and therefore to be able to be, transferred via the communication space 13. In the biopharmaceutical field, the certain contents C can be, for example, a sterile object such as a receptacle, a receptacle element such as a stopper, a syringe, but also environmental monitoring elements, and even waste produced during the operation of manufacturing or treatment, waste that it is a matter of transferring so as to eliminate it . . . .

Transfers, such as those considered here, take place within the framework of more complex processes in which the certain contents C experience one or more operations before and/or after the transfer These operations consist of manufacturing, assembly, treatment, handling, use, measurement, monitoring, analysis, or the like, with the asepsis requirement having to be met.

In contrast, it is important that the transfer of the certain contents C via the communication space 13 not be impeded by the panel 6v of the first door 6 in the open state, that the certain contents C not deteriorate this first panel 6v, and conversely that this first panel 6v not deteriorate the certain contents C, therefore that the first panel 6v cannot be reached by the certain contents C during their transfer.

The invention has as its object both this sealed junction device, and the transfer device that includes it, and the first chamber 1 and the second chamber 2, and, finally, the process for implementing this sealed junction device and this transfer device.

The first flange 5 and the second flange 9 are complementary with one another both structurally and functionally. They are designed so that the panels 6v and 10v are able to be held in a removable way flattened against one another by their outside surfaces 5a and 9a, hermetically sealed, by thus being isolated from the external environment.

For this purpose, it is provided to equip the flanges 5 and 9 with assembly means such as, for example, the complementary shapes provided to their respective surfaces 5a and 9a having to be flattened against one another and one or more sealing joints on the second flange 9.

On the other hand, it is provided to combine a removable interlocking mechanism, for example with cams, not shown, with flanges 5 and 9.

The first door 6 and the second door 10—more specifically their panels 6v and 10v—are complementary with one another both structurally and functionally. They are designed so as to be able to be flattened against one another by the outside surfaces 6a and 10a of their respective panels 6v and 10v, hermetically sealed, by thus being isolated from the external environment.

For this purpose, it is provided to equip the doors 6 and 10—more specifically their panels 6v and 10v—with assembly means such as, for example, the complementary shapes given to their respective outside surfaces 6a and 10a having to be flattened against one another and one or more sealing joints.

Movement actuation means 11b that can move the first door 6—more specifically its panel 6v—between its closed and open states are also provided.

Monitoring means 11c of the movement actuation means 11b are also provided.

The movable or deformable carrying means 11a, the movement actuation means 11b, and the monitoring means 11c are integrated into one another and integrated into the first door 6.

Removable interlocking means that are combined with two doors 6 and 10, not shown, able to keep, in a removable way, the two doors 6 and 10—more specifically their panels 6v and 10v—flattened against one another are also provided.

Such a sealed transfer device is implemented as follows.

A start is made from a situation where the first chamber 1 of which the first door 6, or the panel 6v, is in the closed state and a second chamber 2 of which the second door 10, or the panel 10v, is in the closed state are available, whereby one of the chambers 1, 2 originally contains the certain contents C, as indicated above.

When the first panel 6v is in the closed state, it works with the first opening 4, in such a way that the first opening 4, the first flange 5, and the first panel 6v in the closed state are essentially coplanar aside from thicknesses, with the first panel 6v being retracted, in the direction where it does not project substantially from the first wall 3.

The sealed junction device is implemented between the two chambers 1 and 2, and for this purpose, the successive operating stages that are described below are carried out.

Figure 1:
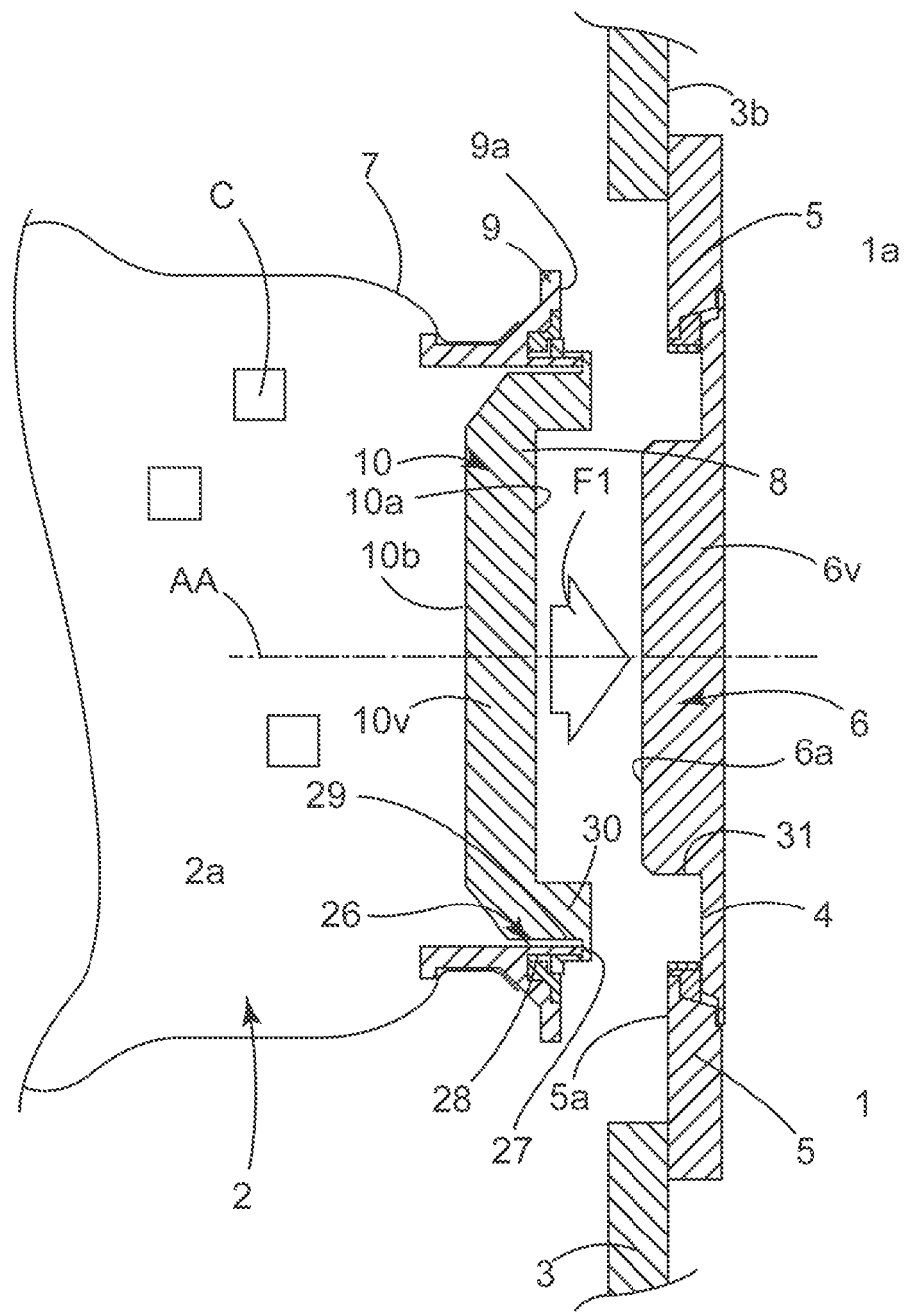

The two chambers 1 and 2 are brought to be placed at least essentially coaxially, facing one another and close together (arrows F1 of FIGS. 1 and 6). Then, the first flange 5 and the second flange 9 are flattened against one another, hermetically sealed, by their outside surfaces 5a and 9a, and the first panel 6v of the first door 6 and the second panel 10v of the second door 10 are brought to be flattened against one another, hermetically sealed, by their outside surfaces (FIGS. 2, 7, 12, 18, 21, 24). The flanges 5 and 9 and the doors 6 and 10 are then coaxial with axis AA.

On the one hand, the first flange 5 and the second flange 9 are rigidly combined, and on the other hand, the two panels 6v and 10v of the first door 6 and the second door 10, flattened as was just indicated, are rigidly combined, and then the first panel 6v is actuated to move it from its original closed state and to bring it into the final fully open state. By so doing, the second panel 10v is moved, and it is also brought from its original closed state to its final fully open state. A movement—or a combination of movements—of the latter that is illustrated in the figures by the arrows F2 corresponds to this movement of the two panels 6v and 10v.

In this situation, the first chamber 1 and the second chamber 2 are in communication with one another via their respective openings 4, 8, with, in the open state, the communication space 13 being provided between the two chambers 1 and 2.

In this situation, the certain contents C of the chamber 1 or 2 where they were originally located are passed to the other chamber 2 or 1, respectively, where it is desired that they be ultimately located (arrows F3).

Once this transfer of the certain contents C is made, the first door 6 and the second door 10, respectively the panels 6v and 10v, are brought into the closed state, at least the door of the chamber where the certain contents C are finally located.

Then, the two chambers 1 and 2 can be separated.

It is understood that the first door 6—more specifically the first panel 6v—can pass through and be at a given instant in an intermediate open state, but not fully open, between the closed state and the open state (FIGS. 8, 9, 10, 13, 16B, 17B, 19, 22, 25, 27).

The communication space 13 has a general shape that corresponds to that of a truncated cylinder with an axis AA that passes through the edges of the openings 4 and 8 or a shape that is close to that of such a truncated cylinder, for example a shape of a double truncated cone or a double truncated pyramid that has a small median base that corresponds to the edge of the openings 4 and 8 and two large bases on both sides, respectively in the chambers 1 and 2, in particular in the inside space 1a that is removed from the first opening 4.

The communication space 13 consists of a first entrance/exit space 13a in the inside space 1a of the first chamber 1 and a second entrance/exit space in the inside space of the second chamber 2.

The first entrance/exit space 13a has a general shape of a truncated cylinder, cone or pyramid, extending into the inside space 1a at least essentially axially with axis AA, starting from the opening 4 and the flange 5.

The first entrance/exit space 13a, shown diagrammatically, is virtually bordered by a proximal end boundary that is formed by the first opening 4 and the first flange 5, by a distal end boundary 13b that is opposite to the first opening 4 and the first flange 5, and by a lateral boundary 13c that is between the proximal and distal end boundaries 13b.

The sealed junction device exhibits in operation what one skilled in the art knows by the term of critical line.

An inside critical line LCi is found on the outside surface 6a of the panel 6v of the first door 6 in contact with the external environment and not overlapped by the outside surface 10a of the panel 10v of the second door 10, when the panels 6v and 10v of the two doors 6 and 10 are applied against one another.

An outside critical line LCe is found on the outside surface 9a of the second flange 9 in contact with the external environment and not overlapped by the outside surface 5a of the first flange 5, when the flanges 5 and 9 are applied against one another.

These critical lines LCi and LCe constitute areas where there is a risk of contamination because they are in contact with the external environment.

These critical lines LCi and LCe are therefore unavoidable because it is impossible that the panel 10v of the second door 10 fully overlaps the panel 6v of the first door 6 and that the outside surface 5a of the first flange 5 fully overlaps the outside surface 9a of the second flange 9, even if the shape and the sizing of the flanges 5 and 9 and of the panels 6v and 10v of the doors 6 and 10, respectively, are selected so that these critical lines LCi and LCe are minimal.

The sealed junction device also comprises means 25 that are structurally integrated into the first door 6 and/or means 26 that are structurally integrated into the second flange 9 that are able—when the first door 6 and the second door 10, respectively the panels 6v and 10v, are in the open state—to form a separation 25, 26 between the communication space 13 and the inside critical annular line LCi and/or the outside critical annular line LCe.

The sealed transfer device that incorporates the sealed junction device therefore itself also comprises the means 25 and/or 26 that can—when the first door 6 and the second door 10, respectively the corresponding panels 6v and 10v, are in the open state—form a separation 25, 26 between the communication space 13 and the inside critical annular line LCi and/or the outside critical annular line LCe.

Integrated—in relation to the means 25 and 26 and to the first door 6 and the second flange 9—is defined as the fact that these means 25 and 26 are, respectively, incorporated in or at least included in the door 6 and the flange 9 in such a way as to form a coherent whole with it. In other words, the means 25 and 26 are not, respectively, extraneous to, connected to, or exterior to the door 6 and the flange 9.

Preferably, the means 25 and 26 are completely integrated into the first door 6 and in the second flange 9.

The process for implementing the sealed junction device is such that when the first door 6 and the second door 10 are in the open state, the above-indicated integrated means 25 and/or 26 are implemented, and said separation 25, 26 thus is formed. This separation 25, 26 constitutes by itself the means for protection against any contamination at the location of the inside critical annular line LCi and/or the outside critical annular line LCe.

Preferably, protection is ensured for the inside critical annular line LCi and the outside critical annular line LCe. However, in certain situations, it is possible to consider only ensuring protection of only one of the two critical lines LCi and LCe.

Each of the integrated means 25 and 26 can be the object of one of the two following embodiments.

In a first possible embodiment that in particular FIGS. 1 to 10 illustrate, the integrated means 25, 26 come in the form of an annular deflector, more generally a barrier that forms an obstacle, placed between the communication space 13 and the critical line LCi, LCe.

In a second possible embodiment that in particular FIGS. 11 to 28 illustrate, the integrated means 25, 26 come in the form of a separation space 12 of adequate appropriate size placed between the communication space 13 and the critical line LCi, LCe.

In both cases, the critical line LCi, LCe thus normally cannot be reached while the certain contents C are passing into the communication space 13.

Expressing that a critical line LCi, LCe normally cannot be reached during the passage of the certain contents C into the communication space 13 means that when the certain contents C are passed from one to the next chamber 1, 2 under normal conditions of use of the sealed transfer device, the certain contents C do not come into contact with the critical line LCi, LCe. Normal conditions of use of the sealed transfer device are defined by the fact that the certain contents C are transferred along the path that is adapted to the shape of the communication space 13, for example in the median part of this space.

More specially, a variant embodiment of means 26 integrated into the second flange 9 according to the first embodiment (barrier that forms an obstacle in the form of an annular deflector) will now be described with reference to FIGS. 1 to 5.

In this variant, means 26 are provided in the form of an annular deflector that is integrated into the second flange 9 and that borders the second opening 8 on its periphery. This deflector 26 projects from the free frontal plane of the second flange 9 that forms an interface with the first flange 5 that consists of the outside surface 9a.

The deflector 26 has a general cylindrical shape that corresponds to the shape of the second opening 8. If applicable, according to a possibility that is not shown, its free distal edge 27 (separated from the body of the flange 9) is slightly tapered laterally.

With the outside peripheral part of the second flange, the deflector 26 forms an annular cavity 28 in the bottom or in the vicinity of the bottom from which there is an outside critical line LCe. This structure reinforces the separation exerted by the deflector 26 between the communication space 13 and the outside critical line LCe.

Figure 2:
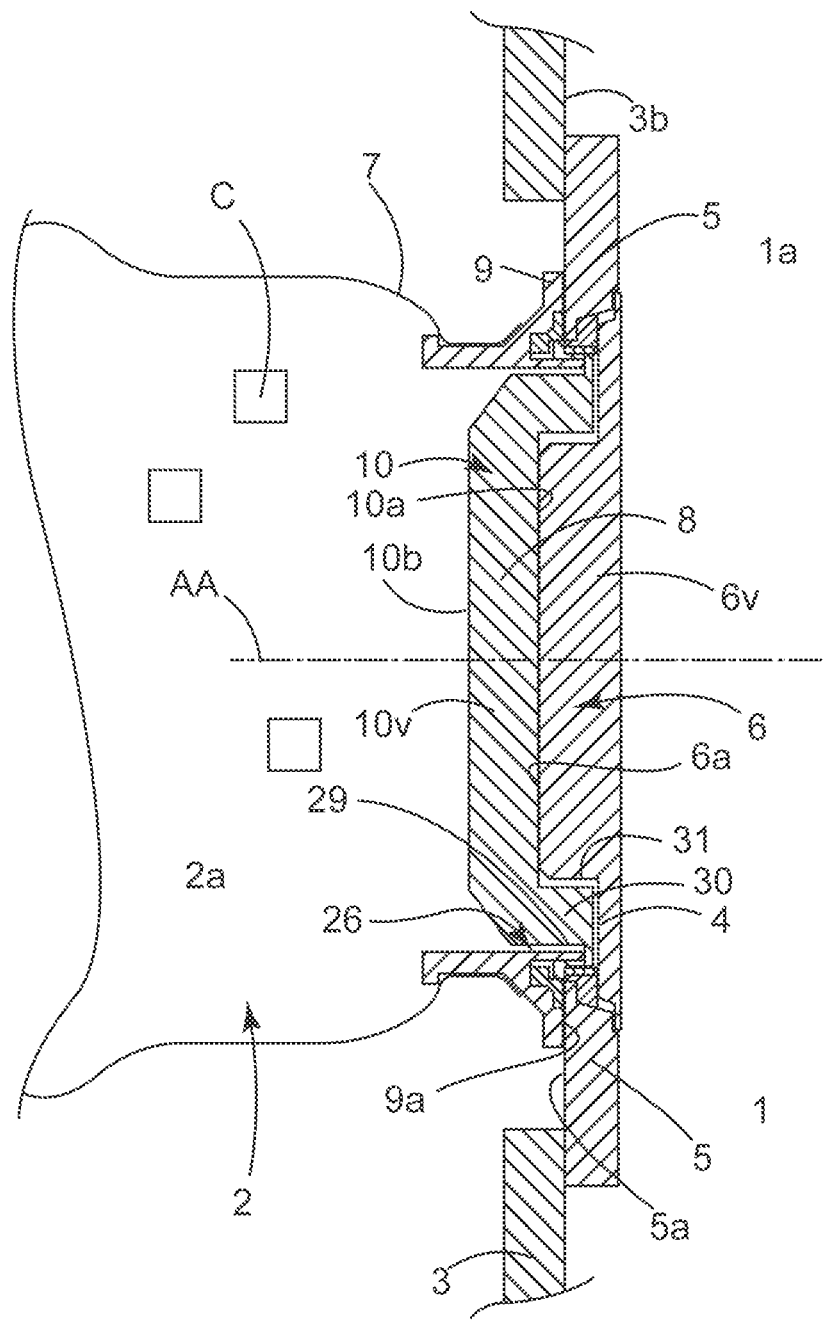
FIG. 2 is a view that is analogous to that of FIG. 1, whereas the two flanges and the panels of the two doors of the two chambers are applied on one another, with the doors of the two chambers being in the closed state.
Figure 3:
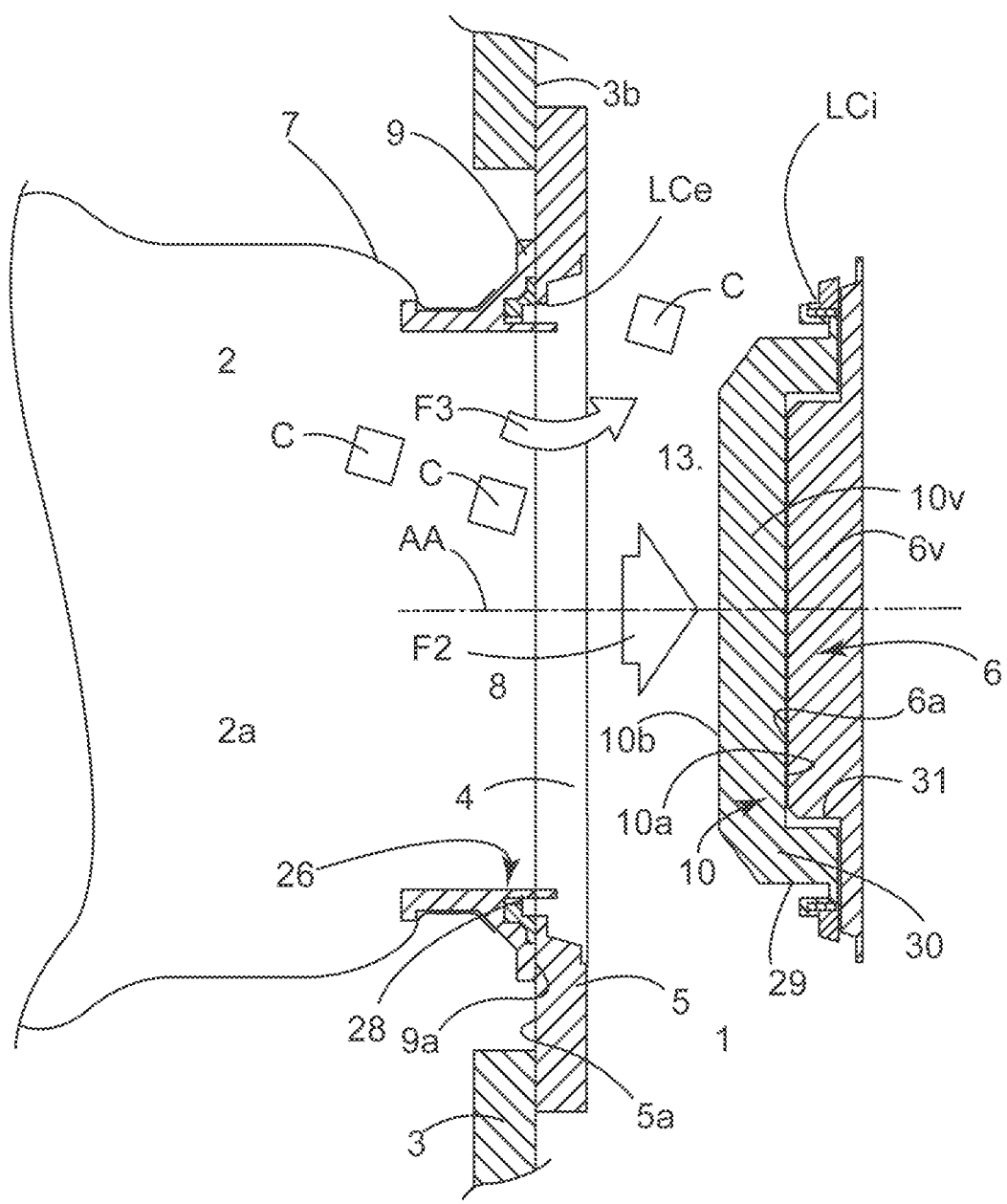
FIG. 3 is a view that is analogous to that of FIG. 2, whereas the two doors are in the open state, but not completely.
Figure 4:
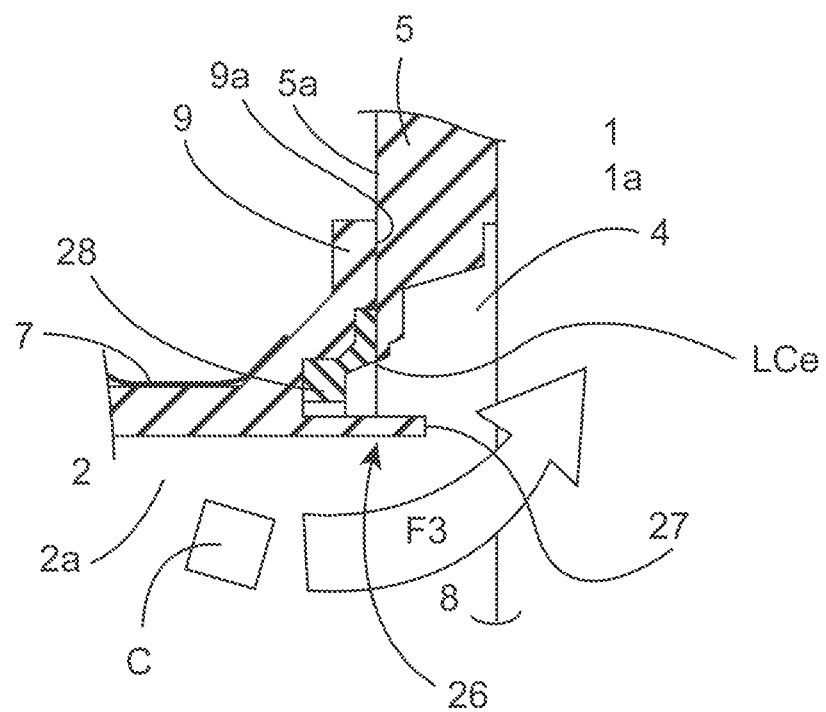
FIG. 4 is a partial view and on a larger scale of FIG. 3, showing the separation between the communication space and the outside critical annular line.
Figure 5:
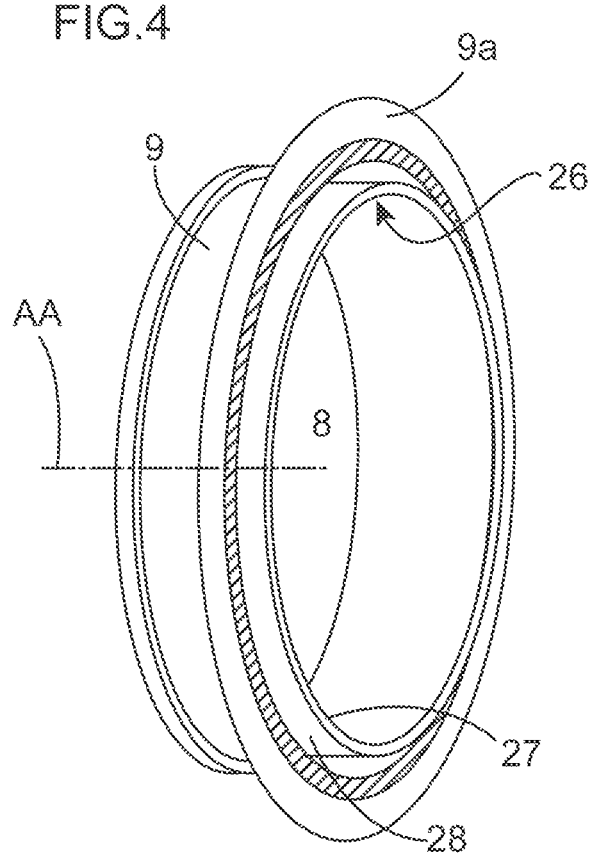
FIG. 5 is a partial perspective view of the embodiment shown in FIGS. 1 to 4.

Taking into account the presence of the projecting deflector 26 and that the second flange 9 forms a seat for the second door 10, it is provided that the panel 10v of the second door 10 comprises on its inside surface 10b an annular groove 29 that opens toward the inside of the second chamber 2. This groove 29 is arranged in such a way as to be able to accommodate the deflector 26 of the second flange 9 when the second door is in the closed state on the second flange 9 (FIGS. 1 and 2).

The groove 29 is advantageously made toward the inside of a rounded annular peripheral part 30 of the panel 10v of the second door 10.

Toward the outside surface 10a of the second panel 10v, this rounded part 30 forms a part that is shaped like a tenon and that can be housed in a complementary part in the shape of a mortise 31 that is made on the outside surface 6a of the panel of the first door 6.

More specially, a variant embodiment of the means 25 that are integrated into the first door 6 will now be described, according to the first embodiment (barrier that forms an obstacle in the form of an annular deflector) with reference to FIGS. 6 to 10.

In this variant, means 25 are provided in the form of an annular deflector that is integrated into the first door 6.

In the case that is shown in the figures, this deflector 25 is part of the carrying means 11a of the panel of the first door 6 when the latter is at least in the open state.

The deflector 25 is arranged around the first door 6.

Alternately, the deflector 25 is supported by the carrying means 11a.

According to another possibility, not shown, the deflector 25 is made part of the panel 6v itself of the first door 6.

The deflector 25 has a general cylindrical shape that is broader than the shape of the panel 6v of the first door 6 and the panel 10v of the second door 10 and broader than the openings 4 and 8. If applicable, according to a possibility, not shown, its free distal edge 32 (separated from the carrying means 11a of the panel of the first door 6 or the panel of the first door 6) is slightly tightened laterally.

With the central part 33 of the carrying means 11a, the deflector 25 forms a cavity 34 for protection of the inside critical line LCi.

Means are provided for passing the panel 6v of the first door 6 and the panel 10v of the second door 10 that is flattened on itself from the closed state to an intermediate open state where the two panels 6v and 10v are separated from the openings 4 and 8 and placed—and held—in the cavity 34 (FIG. 8).

The deflector 25 defines the axial depth of the cavity 34. This axial size is larger, and in particular is considerably larger, than the axial space requirement of the panel 6v of the first door 6 and even in the axial space requirement of the unit that comprises the panel 6v of the first door 6 and the panel 10v of the second door 10 flattened on the panel 6v of the first door 6.

Thus, the inside critical line LCi is placed deeply enough in the cavity 34, which ensures the separation function filled by the deflector 26.

In this variant, it is provided that the carrying means 11a of the first door 6 are means to rotate around an axis 35 arranged approximately parallel to the outside surface 5a of the flange 5 and orthogonally to the axis AA. Thus, the panel 6v of the first door 6 and the panel 10v of the second door 10, flattened on it, are moved in concert from the intermediate open state to the fully open state.

The course of rotation of the carrying means 11a of the first door 6 and the panel 6v of the first door 6 itself is such that the panel 6v of the first door is separated from the communication space 13. For example, the course of rotation is on the order of one-quarter turn. According to another possibility, this course is on the order of a half-turn. With this arrangement, it is possible to produce a separation space 12 of a large enough size between the communication space 13 and the inside critical line LCi when the first door 6 is in the open state.

The axis 35 is separated orthogonally from the plane of the first flange 5 toward the interior of the first chamber 1, in such a way as to allow the deflector 25 to be placed between the central part 33 of the carrying means 11a and the inside surface 3b of the wall 3 of the first chamber 1, around the first opening 4. For this purpose, the axis 35 can be supported by a bracket 36 that projects from the wall 3 toward the interior of the chamber 1 over a length that corresponds to the axial length of the deflector 25.

In contrast, the axis 35 is separated laterally (parallel to the wall 3) from the panel 6v of the first door 6 by a mechanism plate 15, in such a way as to separate the deflector 25, the panel 6v of the first door 6 and the inside critical line LCi of the communication space 13, when the first door 6 is in the open state. For this purpose, the bracket 36 is offset laterally in the removal from the first opening 4, the first flange 5, and the position of the first panel 6v in the closed state.

With this arrangement, it is possible to produce a separation space 12 of large enough size between the communication space 13 and the inside critical line LCi.

If the lateral spacing that results from the separation and/or the movement of the panel 6ν of the first door 6 is significant enough, this separation space will reinforce the separation that is exerted by the deflector 25 between the communication space 13 and the outside critical line LCe.

More specially, in a general way—and according to different variant embodiments—the second embodiment of means 25 that are integrated into the first door 6 and that assume the shape of a separation space 12 of appropriate size will now be described, with reference to FIGS. 11 to 28.

In these variants, means 25 are provided in the form of a separation space 12 of an appropriate size, with the carrying means 11a and the movement actuation means 11b of the first door 6 being arranged in such a way that in the open state of the first panel 6ν, the first panel 6ν is substantially separated beyond the boundary 13b, 13c of the first entrance/exit space 13a, with the separation space 12 thus being made between the first entrance/exit space 13a and the first panel 6ν in the open state.

According to the embodiments that can be considered, the separation space 12 is located beyond the lateral boundary 13c of the entrance/exit space 13a (FIGS. 14, 15, 16C, 17C, 20, 26, 28) or is located beyond its distal end boundary 13b (FIG. 23).

"Substantially separated" is defined as the fact that the first panel 6ν is removed and separated beyond the boundary 13b, 13c of the first entrance/exit space 13a, and that between any area of the first panel 6ν and the boundary 13b, 13c that is the closest of the first entrance/exit space 13a, there is an interval that consists of a distance $e$ that, on the scale of the size $E$ of the first entrance/exit space 13a that is computed in the direction of this interval or is computed at this distance $e$, not only is not insignificant but even is noteworthy and noticeable.

When the separation space 12 is located beyond the lateral boundary 13c of the first entrance/exit space 13a, the direction in which $e$ and $E$ are computed is a direction that is orthogonal to the axis AA and parallel to the first opening 4, the first flange 5, and the position of the first panel 6ν when it is in the closed state. When the separation space 12 is located beyond the distal end boundary 13b of the first entrance/exit space 13a, the direction in which $e$ and $E$ are computed is the axial direction AA, i.e., orthogonal to the first opening 4, the first flange 5, and the position of the first panel 6ν when it is in the closed state.

In the applications that are more specially considered where the first opening 4 has a diameter on the order of 10 to 40 centimeters, E can be of the same order of magnitude (10 to 40 centimeters), and the separation $e$ that constitutes the separation space 12 can be between a minimum value on the order of 3 centimeters and can go up to 40 centimeters.

Although the separation $e$ is not directly proclaimed the size $E$, it turns out that the separation $e$ can be at least equal to one-quarter of $E$, or even at least equal to one half of E, or even at least equal to $E$.

It should be noted that the invention that is intended for the biopharmaceutical field makes it possible to consider openings 4 and 8 and panels 6ν and 10ν of which the diameter is larger than the current diameters, let us say a diameter that is larger than 40 centimeters.

The word "diameter" is to be understood as the largest width of the first opening 4, the latter not necessarily being circular.

"Open state of the first panel 6ν" is defined as the state in which the separation space 12 is made as defined or a primary open state where a primary separation space 12 is made as defined, with the first panel 6ν also being able to be in a final open state in which an interval that constitutes a greater distance than that of the primary open state is made between it and the entrance/exit space 13a.

According to the embodiments that can be considered, the separation space 12 is an empty space (FIGS. 14, 16C, 20, 23, 26, 28) or else the chamber 1 also comprises a separation wall 14 that is stationary or movable that, in the open state of the first panel 6ν, is placed and extends, at least partially, between the first panel 6ν and the entrance/exit space 13a (FIGS. 17A, 17B, 17C).

According to the embodiments that can be considered, such a separation wall 14 is stationary (FIGS. 17A, 17B, 17C) or it is movable.

According to an embodiment that can be considered, such a separation wall 14 can be combined structurally with the structure of the first chamber 1, in particular with the first wall 3, in which case the separation wall can be stationary (FIGS. 17A, 17B, 17C) and can form with the wall 3 a protective cavity 14a of the first panel 6ν in the open state—and therefore the second panel 10b—and therefore also a protective cavity of the inside critical line LCi in this state of the first panel 6ν and the second panel 10ν. Such a protective cavity 14a comprises an entrance/exit opening by which the first panel 6ν and the second panel 10ν are able to enter into or exit from the protective cavity 14 by sliding and translational movement in their own planes, such as a slot.

According to another embodiment that can be considered, such a separation wall 14 can be combined structurally with the first door 6 and/or with its carrying means 11a or movement actuation means 11b, in which case the separation wall 14 is movable. For example, an annular deflector that is integrated into the first door 6, analogous to the deflector 25, described above in relation to the first embodiment (barrier forming an obstacle in the form of an annular deflector) and FIGS. 6 to 10, can be provided.

According to the embodiments that are shown, the first panel 6ν in the open state is arranged in a position that is at least approximately parallel to the first opening 4, the first flange 5, and the first panel 6ν when it is in the closed state. In this case, the first panel 6ν is arranged in a position that is at least approximately orthogonal to the axis AA of the first entrance/exit space 13a.

According to another embodiment, not shown, the first panel 6ν in the open state is arranged in a position that is at least approximately orthogonal to the first opening 4, the first flange 5, and the first panel 6ν when it is in the closed state. In this case, the first panel 6ν is arranged in a position that is at least approximately parallel to the axis AA of the first entrance/exit space 13a.

According to the embodiment that is shown in FIG. 23, the first panel 6ν in the open state is arranged in a position that is at least approximately opposite the first opening 4, the first flange 5, and the position of the first panel 6ν in the closed state. This embodiment corresponds to the case where the separation space 12 is located beyond the distal end boundary 13b of the first entrance/exit space 13a.

According to the embodiments that are shown in FIGS. 15, 16C, 17C, 20, 26, 28, the first panel 6ν in the open state is arranged in a lateral position in relation to the first opening 4, the first flange 5, and the first panel 6ν when it is in the closed state. This embodiment corresponds to the case where the separation space 12 is located beyond the lateral boundary 13c of the first entrance/exit space 13a.

It is understood that when the first chamber 1 is combined with a second chamber 2, within the framework of a sealed junction device and an aspetic transfer device, the first panel 6v supports the second panel 10v, with the two panels 6v and 10v being made integral, flattened against one another by their respective outside surfaces 6a and 10a that are in contact.

The carrying means 11a and the movement actuation means 11b of the first door 6, just like the arrangement and the kinematics of the first door 6, in particular its panel 6a, can be the object of several embodiments that are structurally different but all having the effect of ensuring that in the open state of the first panel 6, the latter is substantially separated beyond the boundary 13b, 13c of the first entrance/exit space 13, with the creation of the separation space 12.

In a general way, the carrying means 11a and the movement actuation means 11b are arranged to be suitable for moving the first panel 6v between its closed and open or primary open states, in a movement that comprises an initial separation movement of the first panel 6v from the first flange 5.

In one embodiment, this initial separation movement is an at least essentially initial translational movement along an axis that is at least approximately orthogonal to the first opening 4, the first flange 5, and the position of the first panel 6v in the closed state (FIGS. 13, 16B, 17B, 19, 22).

In another embodiment, this initial separation movement is an initial rotational movement around an axis that is at least approximately parallel to the first opening 4, the first flange 5, and the position of the first panel 6v in the closed state (FIG. 24).

In another embodiment, this initial separation movement is an at least essentially initial translational moment of the first panel along a curvilinear axis (FIG. 28).

In a no less general way, the carrying means 11a and the movement actuation means 11b are arranged to be able to move the first panel 6v between its closed and open or primary open and final open states, in a movement that comprises an initial separation movement of the first panel 6v from the first flange 5, as it was just indicated, and at least one subsequent movement that is a subsequent translational movement and/or at least one subsequent rotational movement.

This subsequent translational movement or rotational movement can be the object of several embodiments.

In one embodiment, the axis of translation of the subsequent translational movement is an axis that is at least approximately rectilinear.

For example, this axis of translation can be at least approximately parallel to the first opening 4, the first flange 5, and the position of the first panel 6v in the state that is closed and approximately orthogonal to the axis AA (FIG. 20). Or, alternately, this axis of translation can be approximately orthogonal to the first opening 4, the first flange 5, and the position of the first panel 6v in the closed state and approximately parallel to the axis AA (FIG. 23).

Or, according to another embodiment, not shown, this translational axis may be not orthogonal or parallel to the first opening 4, the first flange 5, and the position of the first panel 6v in the closed state or parallel or orthogonal to the axis AA, but inclined in relation to the first opening 4, the first flange 5, and the position of the first panel 6v in the state that is closed and inclined in relation to the axis AA.

In another embodiment, the axis of translation of the subsequent translational movement is a curvilinear axis (FIGS. 27 and 28).

In another embodiment, the subsequent movement is not a translational movement, but a rotational movement around an axis.

For example, this axis of rotation can be at least approximately parallel to the first opening 4, the first flange 5, and the position of the first panel 6v in the state that is closed and approximately orthogonal to the axis AA (FIGS. 24, 25, 26, 27, 28).

Or, this axis of rotation can be at least approximately orthogonal to the first opening 4, the first flange 5, and the position of the first panel 6v in the state that is closed and approximately parallel to the axis AA (FIGS. 13, 14, 16A, 16B, 16C, 17A, 17B, 17C).

The structure and the arrangement of the carrying means 11a and the movement actuation means 11b are suitable for the desired kinematics.

Thus, the carrying means 11a and the movement actuation means 11b comprise initial separation means of the first panel 6v from the first flange 5 that are translational means along an axis that is at least approximately orthogonal to the first opening 4, the first flange 5, and the position of the first panel 6v in the closed state (i.e., approximately orthogonal to the axis AA), or rotational means around an axis that is at least approximately parallel to the first opening 4, the first flange 5, and the position of the first panel 6v in the closed state (i.e., approximately orthogonal to the axis AA), as indicated above.

Likewise, the carrying means 11a and the movement actuation means 11b comprise such initial separation means of the first panel 6v and the first flange 5 and subsequent movement means that are translational means and/or rotational means, as indicated above.

The first panel 6v is extended laterally projecting, in an at least essentially coplanar way, by one or more mechanism plates (or arms or appendices) 15 that are part of the carrying means 11a and that make possible the movement of the first panel 6v, following the implementation of the movement actuation means 11b.

According to the embodiments, the first wall 3 comprises one or more through slots 16 that can make possible and ensure the sealed and aseptic passage of the carrying means 11a and/or movement actuation means 11b on both sides of the wall 3, in such a way that from the outside of the first chamber 1, it is possible to monitor the movement of the means 11a and 11b.

More specially, a first family of means 25 integrated into the first door 6 according to the second embodiment (separation space 12 of appropriate size) will now be described, with reference to FIGS. 11 to 20.

More specially, a first embodiment of this first embodiment family will now be described, with reference to FIGS. 11 to 17C.

In this case, the carrying means 11a and the movement actuation means 11b of the first door 6 are arranged to be able to move the first panel 6v from its closed state in a movement that comprises an initial translational movement along an axis that is at least approximately orthogonal to the first opening 4, the first flange 5, and the first panel 6v when it is in the closed state (i.e., parallel to the axis AA), so as to separate the first panel 6v from the first flange 5 as it was indicated above, and at least one subsequent rotational movement around an axis that is at least approximately orthogonal to the first opening 4, the first flange 5, and the first panel 6v when it is in the closed state (i.e., parallel to the axis AA), so as to bring the first panel 6v into its position in the open or primary open or final open state.

In the embodiment of FIG. 15, the rotational movement is at least approximately a half-turn. In the embodiments of FIGS. 16C and 17C, the rotational movement is at least approximately a quarter-turn.

In this open or primary open or final open state, the first panel 6v is arranged in a lateral position in relation to the first opening 4, the first flange 5, and the first panel 6v when it is in the closed state, with this position being at least approximately orthogonal to the axis AA, while the separation space 12 is located beyond the lateral boundary 13c of the first entrance/exit space 13.

In this embodiment, the carrying means 11a and the movement actuation means 11b of the first door 6 comprise at least a first actuator 17 that is arranged along an axis that is at least approximately orthogonal to the first opening 4, the first flange 5, and the first panel 6v when it is in the closed state and ensuring the initial translational movement and at least one rotational movement system 18 along an axis that is at least approximately orthogonal to the first opening 4, the first flange 5, and the first panel 6v when it is in the closed state (i.e., parallel to the axis AA).

Such a rotational movement system 18 can comprise a shaft that comprises a contoured slot having an axial part and an inclined part over the axis of the shaft, with which a pin works.

In the embodiment shown, the course of initial translational movement that is carried out using a first actuator 17 is just that necessary, aside from the necessary degrees of play, to make possible, on the one hand, the subsequent rotational movement, without the first panel 6v and the second panel 10v interfering with the first wall 3 of the first chamber 1 on its inside surface 3b and, on the other hand, the inside surface 10b of the second door 10 (or more precisely the panel 10v of the second door 10) is in the vicinity of the inside surface 3b of the first wall 3, so as not to occupy a useful part of the interior space 1a of the first chamber 1 and to see to it that the interior critical line LCi of the first open door 6 is located toward the inside surface 3b of the first wall 3.

In the embodiment shown, the outside surface 6a of the first panel 6v in its open or primary open or final open state is turned toward—and in particular close to—the inside surface 3b of the first wall 3 of the first chamber 1. Thus, the inside surface 10b of the second panel 10v in its open or primary open or final open state is turned toward and located in the proximity, in particular in the immediate proximity, of the inside surface 3b of the first wall 3 of the first chamber 1.

In this embodiment, the first panel 6v of the first door 6 is extended laterally by a mechanism plate 15, which is supported at least approximately orthogonally at the end of the shaft, arranged along an axis that is at least approximately orthogonal to the first opening 4, the first flange 5, and the first panel 6v when it is in the closed state (i.e., parallel to the axis AA).

Furthermore, this shaft passes through a through slot 16 of the first wall 3, where the contoured slot and the pin of the rotational movement system 18 are provided.

The first actuator 17 acts on the shaft to cause it to slide along its axis.

The shaft is laterally offset away from the first opening 4 and the first flange 5. On the other hand, it is laterally (parallel to the first wall 3) separated from the first panel 6v of the first door 6 because of the presence of the mechanism plate 15.

With a mechanism plate 15 of adequate length and an adequate course of rotation, it is possible to produce a separation space 12 of sufficiently large size, as indicated.

According to a possibility (FIGS. 16A, 16B, 16C), the panels 6v and 10v of the two doors 6 and 10 in the open state are simply located in the inside space 1a of the first chamber 1, adequately separated from the entrance/exit space 13a, as indicated.

According to another possibility (FIGS. 17A, 17B, 17C), a protective cavity 14a of the panels 6v and 10v of the two doors 6 and 10 in the open state, whereas they are flattened against one another, is provided in the first chamber 1. Such a protective cavity 14a is made between the inside surface 3b of the first wall 3 and a separation wall 14 that is arranged parallel to and separated from it. Such a protective cavity 14a comprises an entrance/exit opening of the two panels 6v and 10v by sliding and translational movement in their own planes, such as a slot. With such a structure, the distance separation is reinforced by a separation barrier.

More specially, a second embodiment of this first embodiment family will now be described, with reference to FIGS. 18 to 20.

In this case, the carrying means 11a and the movement actuation means 11b of the first door 6 are arranged to be able to move the first panel 6v from its closed state in a movement comprising an initial translational movement as in the first mode of execution described above, and at least one subsequent translational movement along an axis that is at least approximately parallel to the first opening 4, the first flange 5, and the first panel 6v when it is in the closed state (i.e., orthogonal to the axis AA) so as to bring the first panel 6v into its position in the open or primary open or final open state.

In this open or primary open or final open state, the first panel 6v is arranged as in the first embodiment, described above.

In this embodiment, the carrying means 11a and the movement actuation means 11b of the first door 6 comprise at least the first actuator 17 that is arranged along an axis that is at least approximately orthogonal to the first opening 4, the first flange 5, and the first panel 6v when it is in the closed state (i.e., parallel to the axis AA) and ensuring the initial translational movement and at least a second actuator 19 along an axis that is at least approximately parallel to the first opening 4, the first flange 5, and the first panel 6v when it is in the closed state (i.e., orthogonal to the axis AA).

In the embodiment shown, the course of the initial translational movement that is carried out using the first actuator 17 is like that of the first embodiment described above.

In the embodiment shown, the outside surface 6a of the first panel 6v in its open or primary open or final open state is arranged as in the first embodiment described above. The same is true for the surfaces of the second panel 10v.

In this embodiment, the first panel 6v of the first door 6 is also laterally extended by at least one mechanism plate 15, which is supported at least approximately orthogonally by the first actuator 17 passing through a through slot 16 of the first wall 3.

The first actuator 17 is supported by the second actuator 19.

More specially, a second family of means 25 that are integrated into the first door 6 according to the second embodiment (separation space 12 of appropriate size) will now be described, with reference to FIGS. 21 to 23.

In this case, the carrying means 11a and the movement actuation means 11b of the first door 6 are arranged to be able to move the first panel 6v from its closed state in a movement comprising at least one translational movement along an axis that is at least approximately orthogonal to the first opening 4, the first flange 5, and the first panel 6v when it is in the closed state (i.e., parallel to the axis AA), so as to separate the first panel 6v from the first flange 5, and then to bring the first panel 6v into its position in the open or primary open or final open state.

In this open or primary open or final open state, the first panel 6v is arranged in a position at least approximately facing the first opening 4, the first flange 5, and the first panel 6v when it is in the closed state, this position being at least approximately orthogonal to the axis AA, while the separation space 12 is located beyond the distal end boundary 13b of the first entrance/exit space 13a.

In this embodiment, the carrying means 11a and the movement actuation means 11b of the first door 6 comprise at least one actuator 20 that is arranged along an axis that is at least approximately orthogonal to the first opening 4, the first flange 5, and the first panel 6v when it is in the closed state (i.e., parallel to the axis AA) and ensuring both the initial translational movement and the subsequent translational movement.

The course of translational movement is that necessary to make the separation space 12.

In the embodiment shown, the outside surface 6a of the first panel 6v in its open or primary open or final open state is turned toward and removed from the first opening 4, the first flange 5, and the first panel 6v when it is in the closed state. Thus, the inside surface 10b of the second panel 10v in its open or primary open or final open state is turned toward and also removed from the first opening 4, the first flange 5, and the first panel 6v when it is in the closed state.

In the embodiment shown, the first panel 6v of the first door 6 is laterally extended by a mechanism plate 15, which is supported at least approximately orthogonally at the end of the actuator 20. Preferentially, two diametrically opposite mechanism plates 15 and two actuators 20 are provided.

More specially, a third family of means 25 that are integrated into the first door 6 according to the second embodiment (separation space 12 of appropriate size) will now be described, with reference to FIGS. 24 to 26.

In this case, the carrying means 11a and the movement actuation means 11b of the first door 6 are arranged to be able to move the first panel 6v from its closed state in a rotational movement around an axis that is at least approximately parallel to the first opening 4, the first flange 5, and the first panel 6v when it is in the closed state (i.e., orthogonal to the axis AA), and this so as to separate the first panel 6v from the first flange 5 and then to bring the first panel 6v into its position in the open or primary open or final open state.

In this open or primary open or final open state, the first panel 6v is arranged in a lateral position in relation to the first opening 4, the first flange 5, and the first panel 6v when it is in the closed state, with this position being at least approximately orthogonal to the axis AA, while the separation space 12 is located beyond the lateral boundary 13c of the entrance/exit space 13a.

In this embodiment, the carrying means 11a and the movement actuation means 11b of the first door 6 comprise at least one rotational movement system 21 along an axis 21a that is at least approximately parallel to the first opening 4, the first flange 5, and the first panel 6v when it is in the closed state (i.e., orthogonal to the axis AA) and ensuring both the initial movement and the subsequent rotational movement.

The rotational movement system 21 comprises a hinge with an axis 21a and a means for driving in rotation around the axis 21a.

The course of rotational movement is close to a half-turn.

In the embodiment shown, the outside surface 6a of the first panel 6v in its open or primary open or final open state is turned opposite the inside surface 3b of the first wall 3 of the first chamber 1. Thus, the inside surface 10b of the second panel 10v in its open or primary open or final open state is turned toward and located in the proximity, in particular in the immediate proximity, of the inside surface 3b of the first wall 3 of the first chamber 1.

In the embodiment shown, the first panel 6v of the first door 6 is laterally extended by a mechanism plate 15, which is supported by the articulation of the rotational movement system 21.

With a mechanism plate 15 of sufficient length, it is possible to produce a separation space 12 of sufficiently large size, as indicated.

More specially, a fourth family of means 25 that are integrated into the first door 6 according to the second embodiment (separation space 12 of appropriate size) will now be described, with reference to FIGS. 27 and 28.

In this case, the carrying means 11a and the movement actuation means 11b of the first door 6 are arranged to be able to move the panel from its closed state in a movement comprising a translational movement along a curvilinear axis 22 corresponding at least approximately to an arc with an axis 23 that is at least approximately parallel to the first opening 4, the first flange 5, and the first panel 6v when it is in the closed state (i.e., orthogonal to the axis AA).

In this embodiment, the carrying means 11a and the movement actuation means 11b of the first door 6 comprise at least one deformable parallelogram system 24 along an axis 23 that is laterally offset in relation to the first opening 4, the first flange 5, and the first panel 6v when it is in the closed state.

For example, the course of rotational movement of the deformable parallelogram 24 is on the order of a half-turn.

In the embodiment shown, the outside surface 6a of the first panel 6v in its open or primary open or final open state is turned toward the inside surface 3b of the first wall 3 of the first chamber 1. Thus, the inside surface 10b of the second panel 10v in its open or primary open or final open state is turned toward and located in the proximity, in particular in the immediate proximity, of the inside surface 3b of the first wall 3 of the first chamber 1.

With an axis 23 that is sufficiently offset laterally in relation to the first opening 4, the first flange 5, and the first panel 6v when it is in the closed state, it is possible to produce a separation space 12 of sufficiently large size, as indicated.

The invention claimed is:

1. Sealed junction device between a first chamber (1) and a second chamber that are isolated from the external environment,
the first chamber (1) comprising:
a structure that includes a first wall (3) that borders a first inside space (1a) and has a first opening (4) that is bordered by a first annular flange (5); and
a first door (6) that is supported by the structure and that includes a panel (6v) that is arranged and mounted so as to be able to be moved to be either in the closed state where it works with the first annular flange (5) by closing the first opening (4) or in the open state where it is detached from the first annular flange (5) and placed in the first inside space (1a) by opening the first opening (4);
the second chamber (2) comprising:
a second wall (7) that is equipped with a second opening (8) that is bordered by a second annular flange (9); and
a second door (10) that has a second panel (10v) that is mounted to move between a closed state and an open state, where, respectively, the second panel (10v) closes or opens the second opening (8);
wherein the first annular flange (5) and the second annular flange (9) are complementary and adapted to be held in a removable way, flattened against one another by their end surfaces (5a, 9a);
wherein the first panel (6v) and the second panel (10v) are complementary and adapted to be flattened against one another in a removable way, hermetically sealed, by their outside surfaces (6a, 10a);

wherein the device comprises movement actuation means (11b) for moving the first panel (6v) between its closed and open states, and monitoring means (11c) for monitoring the movement actuation means;

wherein when the first door (6) and the second door (10), respectively their panels (6v and 10v), are in the open state, the first chamber (1) and the second chamber (2) are in communication with one another via their respective openings (4, 8) in the open state, with a communication space (13) that includes an entrance/exit space (13a) in the first chamber (1) and an entrance/exit space in the second chamber (2) being made between the two chambers (1, 2) that make possible passage of contents from one said entrance/exit space to the other;

wherein an inside critical annular line (LCi) of contamination risk exists on the first panel (6v) of the first door (6), and an outside critical annular line (LCe) of contamination risk exists on the second annular flange (9); and wherein the device further comprises protective means for reducing a risk of contamination for the outside critical line, the protective means comprising at least one of a first member (25) surrounding the first door (6) and a second member (26) structurally integrated into the second flange (9) that are adapted, when the first door (6) and the second door (10), respectively their panels (6v and 10v), are in the open state, to form a separation between the communication space (13) and the inside critical annular line (LCi) and the outside critical annular line (LCe).

2. Sealed junction device between two chambers (1, 2) that are isolated from the external environment according to claim 1, wherein the first and second members (25, 26) are annular deflectors and the separation is a separation space (12) of appropriate size that is between the communication space (13) and the critical line, with the latter thus being normally not reachable during the passage into the communication space (13).

3. Sealed junction device between two chambers (1, 2) that are isolated from the external environment according to claim 2, wherein the second member (26) is a first annular deflector (26) that is integrated into the second flange (9), bordering the second opening (8) and projecting from a free frontal plane of the second flange (9) that forms an interface with the first flange (5).

4. Sealed junction device between two chambers (1, 2) that are isolated from the external environment according to claim 3, wherein the first annular deflector (26) forms an annular cavity (28) with an outside peripheral part of the second flange (9) in the bottom or close to the bottom of which there is the outside critical line LCe.

5. Sealed junction device between two chambers (1, 2) that are isolated from the external environment according to claim 3, wherein the panel (10v) of the second door (10) comprises an annular groove (29) that opens toward the interior of the second chamber (2), able to accommodate the first annular deflector (26) of the second flange (9), and a rounded annular peripheral part (30) that comprises—toward the inside—the annular groove (29) and that forms—toward the outside—a tenon-shaped part housed in a complementary part in the shape of a mortise (31) that is made on the outside surface (6a) of the panel (6v) of the first door (6).

6. Sealed junction device between two chambers (1, 2) that are isolated from the external environment according to claim 2, wherein the first member (25) is a second annular deflector (25) that is integrated into the first door (6), supported by or being part of the movement actuation means (11b).

7. Sealed junction device between two chambers (1, 2) that are isolated from the external environment according to claim 6, wherein the second annular deflector (25) forms a protective cavity (34) of the inside critical line LCi with a central part (33) of the movement actuation means (11b) of the first door (6).

8. Sealed junction device between two chambers (1, 2) that are isolated from the external environment according to claim 7, wherein the second annular deflector (25) has a larger axial size than the axial space requirement of the panel (6v) of the first door (6).

9. Sealed junction device between two chambers (1, 2) that are isolated from the external environment according to claim 7, wherein the movement actuation means of the first door (6) are in rotation around an axis (35) that is approximately parallel to the first opening (4), the first flange (5), and the position of the first panel when it is in the closed state.

10. Sealed junction device between two chambers (1, 2) that are isolated from the external environment according to claim 2, wherein the second member (25) is movable to define the separation as the separation space (12) of appropriate size, with the movement actuation means (11b) of the first door (6) being arranged in such a way that in the open state of the first panel (6v), the first panel (6v) is substantially separated beyond the boundary (13b, 13c) of the first entrance/exit space (13a), with the separation space (12) thus being made between the first entrance/exit space (13a) and the first panel (6v) in the open state.

11. Sealed junction device between two chambers (1, 2) that are isolated from the external environment according to claim 10, wherein the first door (6) is supported by the movement actuating means in such a way that the first panel (6v) is arranged and mounted so as to be able to be moved to be in the open state, either in a primary open state where a primary separation space is made or in a final open state where the separation space (12) is made, larger than the primary separation space.

12. Sealed junction device according to claim 10, further comprising a separation wall (14) that, in the open state of the first panel (6v), is placed and extends, at least in part, between the first panel (6v) and the first entrance/exit space (13a).

13. Sealed junction device between two chambers (1, 2) that are isolated from the external environment according to claim 1, wherein the movement actuation means (11b) of the first door (6) are arranged to be able to move the first panel (6v) between its closed and open or primary open states, in a movement that comprises an initial separation movement of the first panel (6v) from the first flange (5) that is a movement that is at least essentially an initial translational movement along an axis that is at least approximately orthogonal to the first opening (4), the first flange (5), and the position of the first panel (6v) in the closed state, or an initial rotational movement around an axis that is at least approximately parallel to the first opening (4), the first flange (5), and the position of the first panel (6v) in the closed state.

14. Process for implementing the sealed junction device between the two chambers (1, 2) that are isolated from the external environment according to claim 1, comprising the steps of:

placing the first chamber (1) of which the first door (6) that comprises a first panel (6v) in the closed state and placing the second chamber (2) of which the second door (10) that comprises a second panel (10v) in the closed state;

bringing the two chambers (1, 2) close to one another, and flattening the first flange (5) and the second flange (9) against one another in a hermetically sealed way via their outside surfaces, and flattening the first panel (6v) of the first door (6) and the second panel (10v) of the second door (10) against one another in a hermetically sealed way; and making integral the first flange (5) and the second flange (9) and the two panels (6v and 10v), and actuating the first panel (6v) to bring the first panel into the open state and thus to also bring the second panel (10v) into the open state, in such a way that the first chamber (1) and the second chamber (2) are in communication with one another via their respective openings in the open state, with a communication space (13) being provided between the two chambers (1, 2), making it possible to make certain contents pass between them;

wherein when the first panel (6v) of the first door (6) and the second panel (10v) of the second door (10) are in the open state, the at least one of the first and second members are implemented to form the separation between the communication space (13) and the inside critical annular line (LCi) and the outside critical annular line (LCe) of the sealed junction device.

15. First specially designed chamber (1) that is suitable for being combined with a sealed junction device with a second chamber (2), comprising:

a structure that includes a closed wall (3) that borders an inside space (1a), at least one opening (4) that is made in the wall (3) and bordered by a first annular flange (5) of which the outside surface (5a) is able to ensure the hermetically-sealed flattening on itself of the outside surface (9a) of a second complementary flange (9) that is part of the second chamber (2), removable holding means, combined at least in part with the first flange (5), for holding in a removable way the first flange (5) and the second flange (9) that are flattened against one another by their outside surfaces (5a and 9a), a first door (6) that is supported by the structure by means of the movable or deformable carrying means (11a), of which the first panel (6v) is arranged and mounted so as to be able to be moved to be either in the closed state where it works with the first flange (5) by closing the first opening (4) or in the open state where it is released from the first flange (5) and placed in the inside space (1a) by opening the first opening (4), and of which the outside surface (6a) is able to ensure the hermetically-sealed flattening on itself from the outside surface (10a) of the panel (10v) of a second complementary door (10) that is part of the second chamber (2), means for removable interlocking combined at least in part with the first door (6), able to hold the first panel (6v) and the second panel (10v), flattened against one another by their outside surfaces (6a and 10a), in a removable way, movement actuation means (11b) for moving the first panel (6v) between its closed and open states, and means for monitoring the movement actuation means (11b), and, when the first panel (6v) is in the open state, a first entrance/exit space (13a) in/of the inside space (1a), in the general shape of a truncated cylinder, cone or pyramid, extending into the inside space at least approximately axially from the first opening (4) and the first flange (5), whereby this first entrance/exit space (13a) is part of a communication space between the two combined chambers and is able to make it possible to pass certain contents into/out of the inside space, from one to the other of the two chambers, wherein the first chamber is attachable to the second chamber (2) by a sealed junction device according to claim 1, and means that are structurally integrated into the first door (6) for—when it is in the open state—forming a separation (25) between the communication space (13) and the inside critical annular line (LCi).

16. Second chamber (2), specially designed to be part of a first chamber (1) of a sealed transfer device between the two chambers (1, 2), comprising:

a second wall (7) that is equipped with a second opening (8) that is bordered by a second annular flange (9);

a second door (10) of which the panel (10v) is mounted to move, able to be in the closed state or in the open state or, respectively, the second panel (10v) closes or opens the second opening (8), wherein the second chamber is attachable to the first chamber (1) by the sealed junction device according to claim 1; and means (26) that are structurally integrated into the second flange (9) that, when the second door (10), respectively the second panel (10v), is in the open state, form a separation (26) between the communication space (13) and the outside critical annular line (LCe).

17. Sealed junction device between two chambers (1, 2) that are isolated from the external environment according to claim 9, wherein the movement actuation means (11b) of the first door (6) is separated in the inside space (1a) of the first chamber (1) so that the deflector (25), in the open state of the first panel (6v), is placed between the central part (33) of the carrying means (11a) or the movement actuation means (11b) and the inside surface (3b) of the first chamber (1) around the first opening (4), and separated laterally from the panel (6v) of the first door (6) so as to separate the deflector (25), the panel (6v) of the first door (6), and the inside critical line LCi of the communication space (13) when the first panel (6v) is in the open state.

18. Sealed junction device between two chambers (1, 2) that are isolated from the external environment according to claim 11, wherein the separation space (12) is located beyond the lateral boundary (13c) or beyond the distal end boundary (13b) of the first entrance/exit space (13a) opposite to the first opening (4) and the first flange (5), and is an empty space.

19. Sealed junction device between a first chamber and a second chamber that are isolated from the external environment according to claim 1, wherein the protective means comprises both the first member (25) surrounding the first door (6) and the second member (26) structurally integrated into the second flange (9).

\* \* \* \* \*